Figure 1:
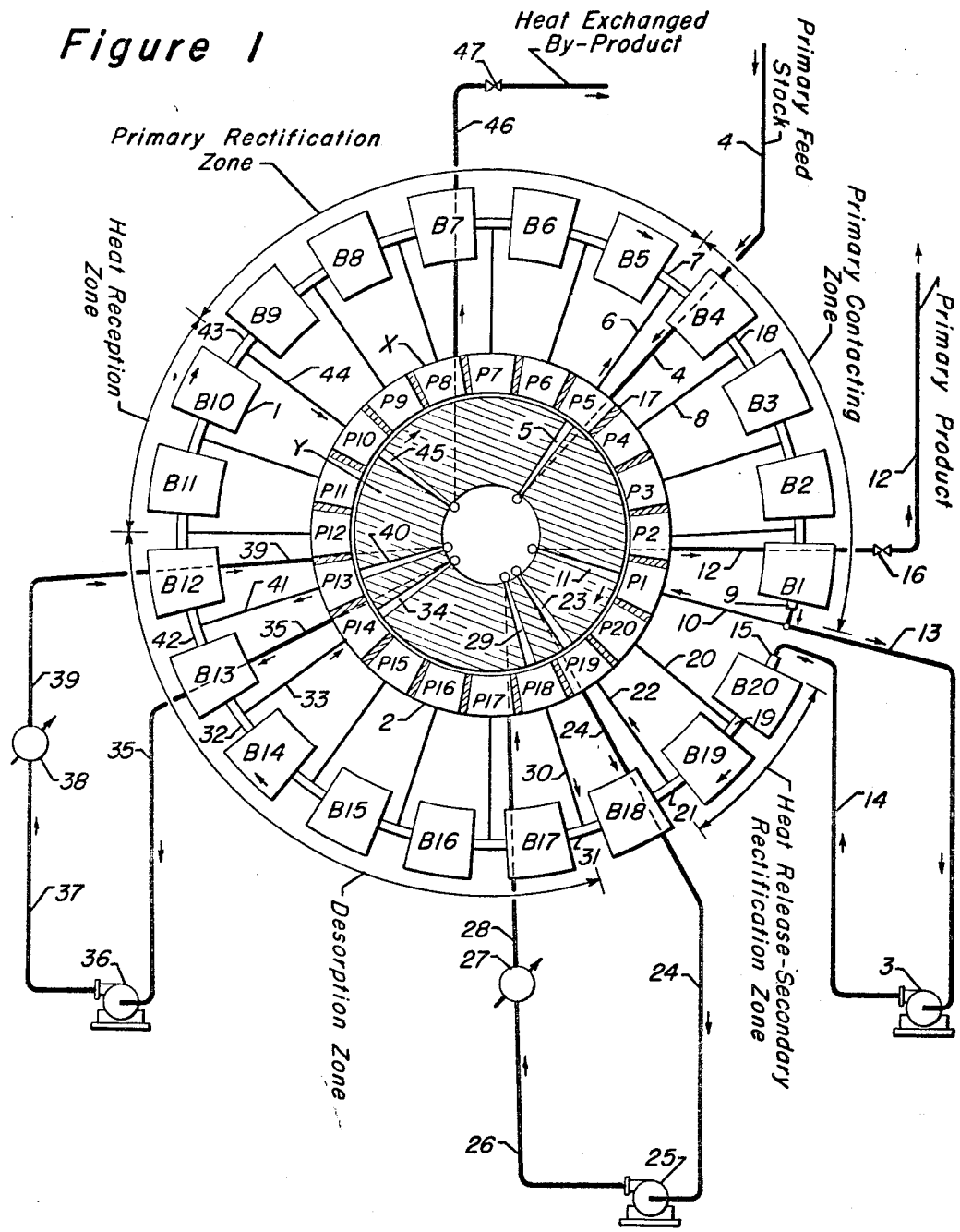

Jan. 25, 1966  L. O. STINE ET AL  3,231,492
FLUID-SOLID CONTACTING PROCESS
Filed May 16, 1962  2 Sheets-Sheet 1

INVENTOR.
Laurence O. Stine
Leslie C. Hardison
Anthony G. Lickus
BY: Chester J. Giuliani
Donald E. Maehling
ATTORNEYS Jan. 25, 1966     L. O. STINE ET AL     3,231,492

FLUID-SOLID CONTACTING PROCESS

Filed May 16, 1962     2 Sheets-Sheet 2

INVENTORS:
Laurence O. Stine
Leslie C. Hardison
Anthony G. Lickus

BY: Chester J. Giuliani
Donald E. Moehling
ATTORNEYS

United States Patent Office 3,231,492
Patented Jan. 25, 1966

3,231,492
FLUID-SOLID CONTACTING PROCESS
Laurence O. Stine, Western Springs, Leslie C. Hardison, Arlington Heights, and Anthony G. Lickus, Riverside, Ill., assignors to Universal Oil Products Company, Des Plaines, Ill., a corporation of Delaware
Filed May 16, 1962, Ser. No. 195,207
22 Claims. (Cl. 210—24)

This invention relates to a continuous process for changing the temperature of a fluid stream by heat exchanging the fluid with a fixed bed of solid particles maintained in a cyclic flow pattern under simulated moving bed flow conditions whereby the heat in the solid phase is transferred to the fluid stream, while simultaneously contacting a downstream portion of the continuously circulating fluid stream with a downstream section of the bed of solid particles to thereby substantially restore the heat exchange capacity of the solid particles thereto. More specifically, this invention concerns a continuous, cyclic process for changing the temperature of a fluid stream by adding or removing the heating or cooling capacity of a fixed bed of solid particles to the stream and at a downstream point along the line of fluid flow, restoring the heating or cooling capacity to the solid particles and returning the fluid stream to substantially its inlet or datum temperature. Thus, by means of the unique flow arrangement provided herein a hot (or cold) zone is continuously maintained in a fixed bed of particles and continuously shifted in a downstream direction by means of a simulated moving bed flow arrangement for the solid particles, while continuously introducing a feed stream into the bed of particles and raising or lowering the temperature of the stream by heat exchange between the solid and fluid phases, but continuously recovering such heating or cooling capacity of the solid phase without substantial loss of such capacity from the process flow.

One object, therefore, of the present invention is to provide an economical, efficient method of heating or cooling a fluid and returning the fluid to its initial temperature while maintaining its identity and purity. Another object is to provide a continuous, cyclic-flow process for separating one component or class of compounds from a solution of fluid components wherein the solution is contacted at one temperature with particles of a solid separating agent capable of retaining one component or class of compounds at said temperature, in a subsequent stage, but in the same cycle of operation, recovering the retained substance from the solid particles at a different temperature, and returning the effluent product streams to their inlet temperatures—effecting said temperature swings of the solid without substantial actual consumption of heat supplied from an external source. Yet another object is to effect continuous cyclic, countercurrent flow between a fluid phase and a friable particulate solid phase under conditions whereby simulated movement of the solid phase relative to the fluid stream is realized, without actual movement of the mass of particles. Still another object hereof is to provide a process for alternately increasing and decreasing the retentive capacity and/or selectivity of a mass of solid particles relative to a given component of a mixture of compounds by alternately raising and lowering the temperature of the particulate solid without, however, any significant net consumption of heat.

One of the specific objectives of this invention is to provide a continuous method for the removal of salts from an aqueous solution to thereby form a substantially ion-free water product, especially such a process operated at high efficiency and at low cost.

In one of its embodiments this invention relates to a continuous-flow, cyclic process for varying the temperature of a fluid stream along its line of flow through a fixed mass of solid particles which comprises contacting an essentially continuous stream of influent fluid at an inlet temperature in a primary contacting zone containing said particles, contacting a reflux portion of the effluent of the primary contacting zone at a point downstream from the outlet of the primary contacting zone with solid particles having a temperature different than the inlet temperature, and at a more advanced downstream point in the line of fluid flow contacting the continuing fluid stream with said solid particles at substantially said inlet temperature whereby heat is transferred between the solid and fluid phases and the fluid phase attains substantially said inlet temperature, at a still more advanced downstream point of flow withdrawing at least a portion of said fluid from the fixed mass of particles, while permitting a second reflux portion of the fluid to continue to flow into a further downstream mass of particles, displacing interstitial fluid from the void spaces between said particles into said primary contacting zone, and equidistantly advancing in a downstream direction the inlet point of said influent fluid and the withdrawal point of said effluent fluid with respect to said fixed mass of solid particles at a rate of advance which maintains the interstitial fluid substantially in equilibrium with the particles of solid at each point along the line of fluid flow, whereby the point of temperature change in the mass of solid particles is advanced in the same direction, at substantially the same rate, and the same distance in a downstream direction as the advance of the point of inlet and the point of withdrawal of said influent and effluent fluid streams, respectively.

In a more specific embodiment, the present invention relates to a method for removing an ionic component from a liquid feed stock in a continuously operated cyclic process which comprises contacting said feed stock at a low temperature with a fixed mass of solid ion-retention particles whereby the ions are withdrawn from solution and retained by the solid particles to form an effluent stream from the ion-retention zone consisting essentially of deionized water, contacting a desorbent portion of said effluent stream in a downstream desorption zone of the cycle maintained at a relatively high temperature whereby the retained ions on the solid particles are transferred to said liquid desorbent phase, refluxing a portion of the continuously flowing effluent streams from both the ion-retention zone and the ion-desorption zone into the mass of solid particles next adjacent downstream from these respective zones, thereby providing continuous liquid flow between said zones, withdrawing a net deionized water product from the downstream outlet of the ion-retention zone and a concentrated ion desorbate from the downstream outlet of the desorption zone, and advancing the influent liquid point of inlet and the effluent liquid point of outlet with respect to the mass of solid particles at a rate sufficient to obtain a simulated moving bed, countercurrent flow of the solid phase relative to the liquid phase and a simultaneous transfer of heat from the liquid to the solid phase in the downstream portion of the cycle between the desorption and ion-retention zones and the transfer of heat back again from the liquid to the solid phase in the downstream portion of the cycle between the ion-retention and desorption zones.

Other objects and embodiments of the present invention and its application to specific process flows will be referred to in greater detail in the following description of the process and more specifically in the examples which follow.

A flow diagram which figuratively presents the process of this invention in its most general terms is illustrated in schematic representation in FIGURE 1 of the accompanying diagrams, depicting a series of interconnected functional zones, each comprising one or more beds containing solid particles of heat exchange material maintained as fixed masses of particles, into which two or more fluid streams of either gaseous or liquid form may be continuously charged and two or more streams continuously withdrawn, the beds being arranged in such fashion that the fluid stream flowing through the series of beds flows in a continuously cyclic flow pattern and the points of inlet for the influent streams, as well as the points of outlet for the effluent streams are shifted in the same direction as the flow of the continuous fluid stream. Solid particles inherently have large surface areas relative to their physical volume and accordingly are capable of providing heat exchange capacity commensurate with their aggregate surface area with respect to a gaseous or liquid stream flowing through the mass of particles, the fluid stream flowing through and occupying the void spaces between the particles of solid (making up what is referred to herein as "interstitial fluid") and exchanging its sensible heat content through the surface of the particle. The rate of heat exchange between the solid particle phase and the fluid phase (thereby determining the quantity of solid required per unit volume of fluid) is directly proportional to the surface area of the particles, which in turn, is inversely proportional to one-half of the diameter of the solid particle; thus, the rate of heat exchange is doubled as the particle diameter is halved.

The flow arrangement herein provided is particularly adapted to separation processes generally, and particularly to adsorption and absorption processes in which subsequent desorption of the sorbed component of the feed stock is effected by a stream of one of the separated components in the feed stock or by an externally supplied influent fluid, at a higher temperature than the sorption temperature. The process flow involved herein may be adapted to separations in which changes in the temperature of the solid simultaneously changes either or both the selectivity and/or capacity of the solid phase with respect to one or more, but less than all, of the components present in the feed stock mixture. The use of the present flow arrangement is especially appropriate in a process in which the sorbent contacted with the feed stock is a particulate solid which cannot be moved within the process enclosure (e.g., in a moving bed type of process) because of its physical form. Thus, the particles may be fragile, or have a density close to that of the fluid stream with which it is contacted and may therefore require contact with the fluid as a fixed bed. By virtue of the present arrangement of a fixed bed or solid contacting agent and the moving inlet and outlet points which are shifted along the line of flow in the same direction as the continuous fluid stream, a simulated moving bed process is provided in which the particles of solid bear the same relationship to the circulating fluid and to the influent and effluent addition and withdrawal points as would a continuously flowing bed of particles to the circulating fluid and stationary influent and effluent points. Within the scope of this invention, therefore, the present process is adaptable to the separation of one or more relatively polar compounds from a mixture comprising non-polar or less polar components. For example, mercaptans, alkyl sulfides, phenols, thiophenols, acids, amines, organic halides, etc., are recoverable by adsorption from hydrocarbons, such as petroleum fraction utilizing an adsorbent, such as silica gel or activated charcoal as the particulate solid phase. Such separations typically represent adsorptions utilizing solid adsorbents which change in selectivity with rising temperatures, one of the alternative types of processes included within the scope of this invention. Aromatic hydrocarbons such as benzene or naphthalene or olefins and diolefins are selectively adsorbed from hydrocarbon mixtures containing the same and less adsorbable types, such as aliphatic paraffins and/or naphthenes, and processes involving such separations are particularly suitable applications of the process flow provided in this invention, employing particles of a solid having adsorbent properties selective for aromatics or olefins, such as silica gel, activated alumina, charcoal, etc. Both gas phase and liquid phase operations are contemplated within the scope of the present fluid adsorptive separation method. In such adsorption processes, desorption of the adsorbate is generally effected in a separate desorption zone of the process flow by raising the temperature of the adsorbent containing adsorbate in the solid particles and may be assisted by charging a heated stream of an inert gas, steam, or a different specie of the adsorbate hydrocarbon at the same or at a higher temperature than the feed stream, and recovering the desorbed adsorbate from the desorption effluent stream. Thus, in an adsorption process for the recovery of naphthalene, for example, benzene or toluene is a suitable desorbent, supplied to the desorption zone at the same or higher temperature.

Another example of the application of the present process is the recovery of straight chain compounds, such as normal paraffinic hydrocarbons containing three or more carbon atoms per molecule from branched chain or cyclic hydrocarbons employing a sorbent of the molecular sieve type, such as calcium aluminosilicate. These sorbents are porous, fragile particles which pulverize rapidly under conditions of attrition, as for example, if utilized in a fluidized or moving bed system to obtain the advantages of continuous, countercurrent flow. In processes utilizing such sorbents a higher temperature stream of a sorbate-type of hydrocarbon, having a different boiling point than the feed stock sorbate component, is utilized as desorbent.

Another application of the present process flow in which a countercurrent flow arrangement, employing fixed beds of a solid contact agent offers special advantages in the purity of the recovered products and in efficiency of operation, is the method of extracting one or more components of a fluid stream which are soluble in a particular solvent retained within the pores of a porous solid, such as silica gel or charcoal, the capacity of the solvent for the adsorbed component (such as aromatic hydrocarbons) increasing at higher temperatures. Thus, particles of porous charcoal or alumina are infused with a solvent for aromatic hydrocarbons, such as diethylene or triethylene glycol and the particles containing the solvent are maintained in a single fixed bed or in a series of interconnected beds into the absorption zone of which a hydrocarbon feed stock containing the aromatic hydrocarbon is charged at one temperature extreme and into a downstream zone of which a stream of desorbent hydrocarbon is charged at the other temperature extreme existing in the process to recover the absorbed aromatic component from the particles of solid—a system which could not otherwise be adapted to a moving bed, countercurrent flow arrangement because of the friability of the solid particles of adsorbent.

Still another type of solid contacting medium in the form of discrete particles which illustrates the variety of solid particles utilizable in the process herein provided, are materials which act primarily as heat exchange media but which may also serve in the capacity of a filter medium for solids suspended in the liquid feed stocks. Thus, particles such as sand may be placed in the fixed beds of the apparatus for efficiently and continuously heat exchanging in one section of the process flow one fluid stream (e.g., an inlet feed stock for conversion) with a second fluid stream, such as an effluent heated stream of converted products, in a separate section of the process flow, for example, where the objective of the process is to raise the temperature of the feed stream to a higher conversion temperature without the consumption of externally supplied heat.

The foregoing typical applications of the basic flow pattern involved in this invention, as well as others here-after described, are illustrative of the wide variety not only of the types of processes to which the present heat exchange principle may be applied, but also of the variety of solid contacting agents utilizable in the present process flow.

Although the present flow arrangement may be utilized in a process design for the specific and only purpose of transferring heat to a fluid influent stream and restoring the heat to the solid particles before the fluid leaves the heat exchange unit, a particularly useful application of the method is the transfer of heat from products to reactants in conjunction with a conversion process, such as one of the aforementioned typical applications of this invention. Associated with the conversion, the selectivity or capacity of a given solid for effecting or influencing the specific conversion is enhanced by a change in the temperature of the fluid stream in contact with the solid. The present method enables the fluid stream to enter the process flow at one temperature, contact a particulate solid heat exchange material which raises or lowers the temperature of the feed stream to the desired conversion level (the direction of the temperature shift depending upon the particular conditions required by the system) and in a downstream portion of the heat exchange medium, the heating or cooling capacity of the fluid conversion products is transferred to a downstream mass of the solid heat exchange material. Thus, by virtue of the continuously cyclic character of the present process flow, the solid particles in the downstream zone have extracted the heating or cooling capacity of the product streams and store this heat transfer capacity for subsequent transfer to an additional quantity of feed stream when the downstream zones moves into the phase of the cycle in which the solid particles first contact feed stock. The temperature differential between the temperature extremes existing in the process may be large or small because under the flow conditions provided by the present flow arrangement (that is, the almost infinite heat exchange surface afforded by the particles of solid heat exchange medium and the countercurrent flow relationship between the solid and fluid phases), substantially all of the heat is transferred between the solid and fluid phases. Thus, the solid particles act as a temporary storage reservoir for the heat to be transferred between the continuously alternating temperature swings.

One of the outstanding adaptations of the process flow in which the distinctive features of this invention are most advantageously applied, is represented by the recovery of pure water from an aqueous solution containing ions of one or more dissolved salts, such as sea water, utilizing particles of a solid substance having ion-retention properties, such as a resin or an inorganic solid containing both cationic-reactive and anionic-reactive sites in the same or separate ion-retention particles. Generally, such resinous material cannot be utilized in a moving bed type of process because of the difficulties associated with the physical form of the resin, such as the friability and fragility of the particles, as well as the similarity in the densities of the resin and the aqueous phase which give rise to difficulties in circulating the solid particles countercurrent to the liquid phase. A typical process embodying such resins is hereinafter described more fully in the specifications and in the examples which follow. In such a process, one of the essential aspects of the process is the regeneration of the solid ion-retention particles, wherein its anion-retentive and cation-retentive activity are restored by displacement of the retained ions from the solid particles, utilizing a portion of the deionized water product, heated to an elevated regeneration temperature, as regenerant (desorbent) for the spent particles. The heat exchange system provided by the present process, enabling the efficient regeneration of the ion-retention particles with only nominal net consumption of heat, is therefore uniquely applicable to such a process.

Irrespective of any particular application of the present process flow or the relative degrees of merit of applying the principles of the process to any of such specific applications, this invention in its broadest application is directed to a heat exchange process in which an influent fluid at one temperature is contacted under continuous, countercurrent flow conditions with a fixed bed of solid particles having heat exchange capacity and a different temperature than the influent fluid at a rate of fluid flow whereby the influent fluid attains substantially the temperature of the solid particles, while simultaneously transferring the heat exchange capacity of the fluid stream to a mass of solid particles maintained as a fixed bed in a downstream zone of the cyclic flow to thereby heat exchange the second fluid stream with the solid particles to recover the heating or cooling capacity stored in the particles during the preceding stage of the cycle when the particles were contacted with said first fluid stream. The essential or basic principle involved in all of the applications of the present process flow pattern to various processes, irrespective of any change in the composition of the fluid or solid phases, is that one section of a bed of solid particles (which may in a specific instance, for example, be undergoing desorption, regeneration or other conversion) is being heated to a relatively elevated temperature by a hot fluid (the fluid, of course, being cooled by the heat exchange), while simultaneously in another section of the bed of particles a cold fluid stream is being heated to substantially the same elevated temperature by recovering the heat stored in the solid particles when the latter section of the bed was heated during a preceding stage of the cycle. The alternating temperature fluctuations, making any particular portion of the bed alternately a heat reception zone and a heat release zone is made continuously cyclic by a simulated moving bed system wherein the fluid inlets and outlets into and from the fixed bed of particles are continuously or intermittently moved relative to the solid particles in the direction of fluid flow through the bed of particles and at a rate substantially equal to the fluid flow rate. Thus, the alternating heat release and heat reception zones continuously advance with the fluid stream through the bed or beds of particles and the distances between the zones remain substantially fixed. This simulated "circulation" of the heating and cooling zones is accomplished by matching the heating capacity of the solid particles (which are, in effect, "circulated" relative to the feed inlet point) with the heat capacity of the fluid stream (which "circulates" in a direction opposite to that of the solid particles, again relative to the feed inlet point). By adjusting the solid and fluid "circulation" rates to provide for continuous attainment of substantial temperature equilibrium between the solid and fluid phases at all points along the path of flow, a feed stream may be heated or cooled through a wide temperature range and brought back to the feed inlet temperature level, with essentially no net consumption of external heating or cooling capacity.

When reference is made herein to modifying the physical characteristics of the fluid stream in the first fluid-solid contacting zone and again modifying the physical characteristics of the fluid stream in the second, downstream fluid-solid contacting zone, such designation includes within the comprehension of its terms: (1) modifying the temperature of the stream (e.g., in a heat exchange operation) for example, by raising the temperature in a heat release zone of the process flow and subsequently returning the temperature of the stream to the feed inlet temperature in a heat reception zone of the process flow; (2) altering the composition of the fluid stream concomitant with or subsequent to the change in the temperatures of the stream, whereby the selectivity or capacity of the solid particles for a given component of the fluid stream is changed. In such a process one or more components of the fluid stream are either charged or withdrawn from the process flow whereby the concentration of the component in the stream is increased or decreased (e.g., in the removal of dissolved salt from an aqueous stream or the removal of the aromatic components of a mixed hydrocarbon stream, etc.), or (3) modifying the physical state of being of one or more components in the stream (e.g., crystallizing a dissolved salt out of solution or crystallizing water from a salt solution and filtering the precipitated solids in the beds of solid particles).

Both of the basic aspects of this invention (that is, the use of the present flow pattern to effect not only the transfer of heat to or from a mass of solid particles from a fluid stream, but also a supplemental change in the composition of at least one of the influent fluid streams) are illustrated in the accompanying FIGURE 1 which, for simplicity of description, identification of influent and effluent streams, the characterization of functional zones and exemplary equipment, etc., is described herein by reference to the specific process of deionizing an aqueous salt solution, utilizing ion-retention particles which serve both in the capacity of the solid contacting agent for effecting a supplemental change in the composition of the stream and also as the heat exchange medium for effecting the transfer of heat between the influent streams. In this process the solid ion-retention particles (more fully characterized in the examples which follow) are contacted with the feed stock solution at a relatively low temperature (ambient or atmospheric) and after a period of conversion in which the ion-retention particles become at least partially "spent" with respect to retained ions, the particles are heated in a high-temperature aqueous stream (regenerant) of lesser ion content than the feed stock to discharge ions from the ion-retention particles and regenerate the latter for recycle use. The regenerant for this purpose is conveniently derived from an internal source (the deionized water product) or introduced from a source external to the process flow as desorbent. Considering the process as a whole cycle, therefore, the aqueous stream undergoes wide fluctuations in temperatures to effect the alternating ion-retention and particle regeneration stages of the process. The means provided in the present process flow for recovering and conserving the heat required in the resin regeneration stage incorporates many of the heat transfer principles of the present process flow. Since a desalinization process to be practical as a method of supplying potable water at an economical cost, must rely upon a minimum consumption of utilities, the feature of the present process which enables the desalinization of sea water accompanied by only nominal consumption of externally supplied heat per unit of water product, and, hence, in a region of high efficiency and economy of operation, offers an especially attractive use of the present process.

The process of this invention may be visualized as being effected in a series of four, interconnected zones, each having a specific function. Each zone is preferably composed of one or more serially arranged, fixed beds of solid particles of the heat exchange medium through which the fluid flows as an uninterrupted stream. The entire process flow including the four functional zones, may be contained within the confines of a single, elongated fixed bed of particles having no actual line of demarcation between each of the zones, other than the zone boundaries defined by the points of inlet and withdrawal for the various fluid streams. The multiple fixed bed, serial flow arrangement, shown in the accompanying diagrams, in which a number of individual fixed beds of the solid particles of heat exchange medium make up each functional zone is a generally preferred arrangement because the line of flow may be more readily maintained rectilinear and under greater control. The beds are illustrated in superadjacent and subadjacent relationship to each other, although the beds may also be serially arranged horizontally in side-by-side relationship to each other. For the sake of designating a point of beginning with respect to which the position of all other zones are made relative as a matter of convenience, the zone in which the particles of solid are first contacted with feed stock, such as the aqueous salt solution utilized in FIGURE 1 to illustrate the process, is herein referred to as the primary feedstock contacting zone or the "ion-retention" zone in the desalinization illustration, said zone containing four fixed beds (B4 to B1) of solid ion-retention particles. In a process in which heat exchange is substantially the only objective, this zone may also be referred to as a "heat reception" zone in which the heat in a fluid feed stream is transferred by heat exchange to the mass of solid particles in beds B4 to B1, the particles thereby receiving and storing the heat given up by the fluid stream. As a point of reference, this zone is the farthermost upstream zone in the process flow. The next downstream zone, relative to the first feed stock contacting zone (the aforementioned ion-retention zone in the desalinization illustration of FIGURE 1), composed of two fixed beds of ion-retention particles (B20 to B19), is referred to herein as a "secondary rectification" zone and depending upon its supplemental function, may consist of one or more beds in series. The next adjacent zone which is downstream relative to the secondary rectification zone, is herein referred to as the second feed stream contacting zone, or "desorption" zone in the illustrated desalinization process (containing six beds, B17 to B12 inclusive). A portion of this zone (e.g., beds B11 and B10) may be designated a "heat reception" zone wherein the heat contained in the effluent of the desorption zone as represented by the temperature of the stream above the datum or lowest temperature in the system (such as the feed inlet temperature) may be recovered by secondary heat exchange of the desorption zone effluent with the solid ion-retention particles and thereby retained in the process flow by storage in the solid particles. In a process in which heat exchange is the principal objective of the process, the primary fluid contacting zone may also double as a "heat release" zone wherein the heat stored in the mass of solid particles of heat exchange medium is transferred by heat exchange to the primary feed stock and the downstream secondary rectification zone serves as a region for replacement of the interstitial fluid between the particles of solid with hot fluid effluent of bed B1 thereby preparing bed B20 with fluid of changing composition but also of changing temperature. The farthermost downstream zone relative to the first contacting or ion-retention zone, is referred to as a primary rectification zone (containing five beds in series: B9 to B5 inclusive) wherein the interstitial fluid between the particles of solid is replaced with fluid entering the beds comprising this zone from upstream sources. In a heat exchange process for transferring heat from one fluid to another, the primary rectification zone provides a region of fluid transfer in which the effluent stream of bed B10 enters the downstream beds B9, B8 . . . etc., and replaces the interstitial fluid in these beds, preparing the downstream bed for receipt of fluid from the upstream beds.

When referred to herein the terms: "upstream" and "downstream" are to be interpreted in their ordinary and usual definition in the chemical process arts; that is, the term "downstream" refers to an advanced point in the direction of fluid flow relative to the point of reference, whereas "upstream" refers to a retrospective point passed by the reference point in the fluid stream. In a cyclic process, an upstream point may also be considered downstream with respect to the point of reference, but not with respect to the fluid stream, since a downstream point has not as yet been contacted in the preceding cycle by the specific fluid at the point of reference.

The apparatus herein illustrated in FIGURE 1 depicts in plan view an ion-retention column 1 comprising a series of separate beds: B1 to B20 containing solid particles of a substance having heat exchange capacity, such as the particles of an ion-retention resin capable of retaining both cations and anions from an aqueous solution. The beds are illustrated as being arranged in a horizontal or planar configuration with lines connecting the downstream outlets of each bed with fluid inlet and outlet ports: P1 to P20 of a fluid distribution center 2, shown in horizontal cross-section as a valve having a valve housing X and a valve plug Y rotatable in said valve housing in fluid-sealed relationship thereto, except for certain channels in the valve plug and the aforementioned ports P1 to P20 in the valve housing. The ports in the valve housing are in alignment with the channels in the plug to provide means for conducting certain inlet and outlet streams into and from the beds of solid ion-retention particles, depending upon the stage of the process flow under consideration. The fluid distribution center which directs the influent and effluent streams into and from the individual beds in accordance with a continuously cyclic program, although illustrated as a flat-plate type of rotary valve, described more fully in the co-pending application of Don B. Carson et al., Serial No. 805,575, filed April 10, 1959, could also be provided, although less effectively, by any other suitable form of fluid distribution center, such as a manifold arrangement of incoming and outgoing lines containing valves controlled by timed switches, to open and close the appropriate valves to the various lines supplying the beds in a prearranged program of operation. The programming device which is the heart of the fluid distribution center, is an essential portion of the present apparatus by means of which the realization of the type of flow provided in the present process is obtainable, since the points of inlet and outlet into and from the contacting column must be advanced in equal increments and in a downstream direction during the operation of the process, while maintaining the relative spacing between the points of inlet and points of outlet during the course of each cycle. The planar configuration of beds illustrated in the accompanying FIGURE 1, is represented in this manner for simplicity of illustration and as an aid in describing the process flow in its simplest, least encumbered schematic arrangement, although the arrangement of beds or construction of the apparatus would usually (e.g., in a commercial unit) take the form of a vertical column in which the separate beds are stacked one above the other in contiguous or superadjacent relationship to one another, the beds being interconnected in serial-flow arrangement by conduits between the separate beds, as illustrated in simplified form in FIGURE 2 hereof, which will be described in connection with a specific embodiment of the process in the examples hereof.

In applying the terms "upstream" and "downstream" to a vertically stacked arrangement of fixed beds as a means of designating the spacial relationship between various points of reference, it is evident that either downflow or upflow is clearly contemplated to be within the scope of the present invention, depending upon whether the recycle stream (that is, the so-called "pump-around" stream) which makes the process continuously cyclic, is taken from the bottom of the lowermost bed in the column and discharged into the top of the uppermost bed in the series to provide downflow arrangement or, vice versa, in an upflow arrangement wherein the pump-around stream is taken from the top of the column and discharged into the bottom of the last bed in the series of interconnected beds.

Suitable feed stocks or starting materials for use in the embodiment of the invention relating to the desalinization of aqueous solutions, such as the salt water deionization process illustrated in the accompanying FIGURE 1, are aqueous solutions generally of ionizable substances, which may be salts, bases, or acids in concentrations generally up to about 10 percent by weight and more preferably, up to concentrations generally not in excess of about 5 percent by weight of the solution. One of the most useful applications of the present process is the recovery of pure water from natural saline water sources, such as sea water, which may, for example, contain sodium chloride in concentrations up to 3 or 4 percent by weight as well as minor amounts of other salts. Since, in this instance the desired end product is the recovered pure water, the lower the concentration of dissolved salt in the water, the greater the yield of water per unit cost of operation. Accordingly, the desirability of any given feed stock for the production of pure water therefrom increases as the solute content of the solution decreases. On the other hand, if the desired end product is a concentrated solution of the dissolved ionic product, the objective of the process is the removal of diluent water from the solution and the desirability of the solution as feed increases as the salt concentration in the solution increases. One of the preferred charge stocks for the production of pure water from a saline solution is ordinary sea water which contains about 3.3 percent by weight of dissolved solids, predominantly sodium chloride. Other sources of brackish water include sulfite waste liquors which may constitute the feed stock to the present process for the purpose of reducing the concentration of sulfite ion in the waste liquor of paper pulp mills prior to discharge of the effluent into natural streams and rivers. In the event that the ion-retention particles utilized as the heat exchange solid in the desalinization process is a material which undergoes a non-regenerable conversion in the presence of bivalent or trivalent cations, such as $Ca^{++}$, $Mg^{++}$, etc., the sea water feed stock may be pretreated by contact with a sodium zeolite or sulfonated polystyrene ion-exchange resin before the feed stock is admitted into the desalinization unit containing the sensitive ion-retention particles. Such a combination ion-exchange-ion-retention process is an especially operable combination, since the concentrated brine recovered from the outlet of the ion-retention process and containing a high concentration of sodium chloride provides a convenient regenerant for restoring the ion-exchange activity of the resin for removal of polyvalent ions from the sea water feed stock.

The solid particles of contacting agent which provide the heat exchange medium in a heat transfer process and which also provide the ion-retention particles in the desalinization process illustrated in FIGURE 1 are selected on the basis of their ability to accomplish the objectives of the process. Thus, when the objective is nothing more than transfer of heat between two fluid streams, the selection of the most suitable solid particles for this purpose is determined by such factors as surface area per unit volume or weight, heat conductivity, heat capacity, fluid pressure drop through the beds of particles etc. Such particulate solids as sand, metal shot, glass beads, etc., would be considered appropriate for this purpose. When a supplemental process objective must be incorporated into the choice of a suitable solid contacting agent, such as the ability of the substance to effect a change in the composition or other physical characteristic of the fluid stream passing through the beds of contacting medium, rate and capacity factors must also be taken into account, in addition to the heat transfer characteristics of the solid particles. Thus, in the selection of a suitable particulate solid for desalinization of sea water, the composition of the particles (which determine the capacity and rate factors for the particles), as well as the size of the particles must be taken into account. These and other considerations for a typical desalinization process are described in greater detail for a suitable resin in the examples hereinafter presented.

Figure 2:
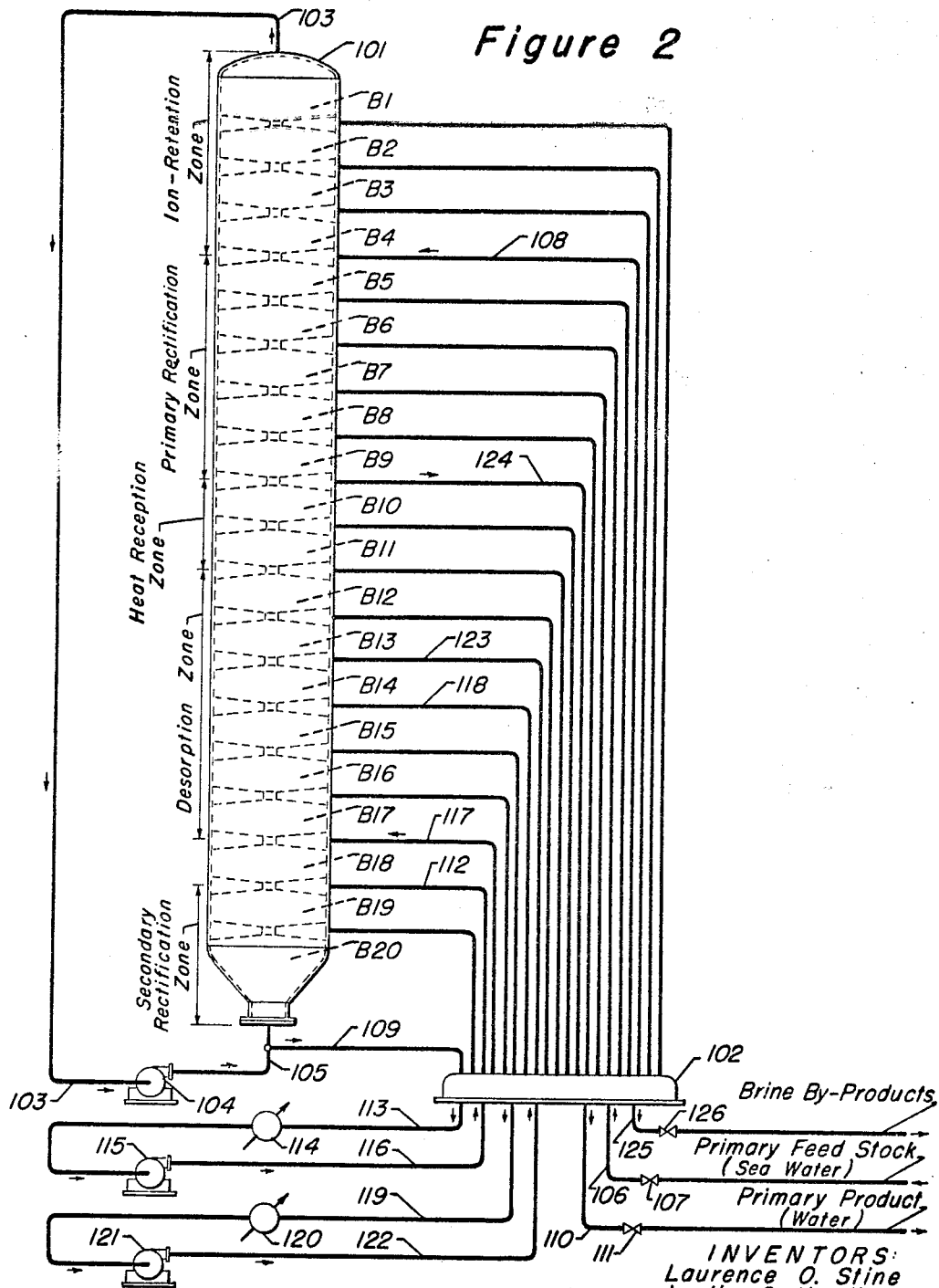

Referring to FIGURE 1 a process flow for contacting a stream of sea water salt solution with a series of fixed beds of solid ion-retention particles for the production of a deionized or substantially deionized water product and a concentrated brine by-product is illustrated in plan view for illustrative purposes. The primary components of the flow arrangement is a contacting column 1 (ordinarily a vertical tower, as shown in FIGURE 2, of the accompanying diagrams) comprising fixed beds: B1 to B20 in serially interconnected relationships to each other and an accompanying fluid distribution center 2 (ordinarily in the form of a multi-channel, multiport valve or a manifold arrangement of pipes), together with the attending flow control valves in the inlet and outlet lines, pumps, heaters or coolers, etc. Contacting column 1, coupled with fluid distribution center 2, constitute the essential, functioning units of a desalinization process flow for effecting heat exchange between the ion-retention particles and the aqueous particle regenerant and the subsequent recovery of heat from the regenerant solution by the cool particles, yielding two effluent product streams: (1) a deionized water product, and (2) a concentrated brine solution, the process flow being made continuously cyclic by alternating the points of inlet with points of outlet through the series of fixed beds.

One of the essential and critical requirements of the present process is that a continuously flowing, cyclic stream of fluid be circulated through the series of fixed beds from the first to the last in the series and from the last to the first in the series, each bed receiving feed solution at the appropriate stage of the process cycle and for a sufficient period of time for the concentration of ions in the feed solution to approach substantial equilibrium with the ion-retention particle before the feed inlet is shifted to the next downstream bed. Pump 3 in the accompanying FIGURE 2 provides the means of circulating the continuous fluid stream in the illustrated process flow. The feed stream (salt solution) enters the inlet end of the first feed stock contacting zone, which in the salt water desalinization process illustrated in FIGURE 1, is an ion-retention zone containing particles of an ion-retention substance, such as a resin capable of retaining both the cationic and anionic solute components of the saline solution.

The primary feed stock (saline solution) enters the process flow through line 4 at a predetermined feed inlet temperature $T_1$ (being the lowest temperature stream in the desalinization process) and at a pressure sufficient to introduce the feed stream into the process cycle at the internal pressure existing at the feed inlet point. The feed inlet stream entering the process flow through line 4, flows into the axle of the valve plug Y of the central distributing valve 2, then into channel 5 of the rotatable plug and thereafter into port P5 of the valve housing X. A connecting conduit, line 6, carries the feed stock from port P5 of the valve to coupler conduit 7 which links the outlet of bed B5 to the inlet end of the next adjacent downstream bed B4. At the particular instant in the process cycle illustrated in FIGURE 1, bed B4 is the first bed (i.e., the farthermost upstream bed) in the series of four beds comprising the primary feed stock contacting zone or ion-retention zone for the illustrated desalinization process. The feed stream flows in a downstream direction (i.e., into bed B4) rather than upstream into bed B5 because of the downstream drop in pressure. A countercurrent flow effect is thereby established between the salt water feed stock and the particles of ion-retention particles, since fresh salt water feed stock containing the highest concentration of salt in the ion-retention stage of the process, contacts particles of the resin in which some of the ion-retentive centers have already been exchanged with salt ions during a preceding stage of the cycle when bed B4 was a downstream bed in the ion-retention zone, prior to the shift of the feed inlet into bed B4 (that is, when one of the preceding beds: B7, B6 or B5 was the primary feed inlet point). Thus, as fresh feed enters bed B4, the ion-retention process partially completed in preceding stages of the cycle, now goes to completion and the resin in bed B4 may be (although not necessarily) substantially "spent" (i.e., in equilibrium with the saline solution) and satiated with the ionic components present in the feed stock to the extent permissible at the particular temperature and concentration of ionic components existing in this stage of the process. Preferably, the volume of ion-retention particles provided in the process flow is sufficient to maintain an excess of ion-retention capacity for the feed "load" or rate of charging stock to thereby ensure substantially complete desalinization on a continuous flow basis. The completeness of desalinization is determined by the ratio of the number of ion-retention centers available in the particles of solid (i.e., the weight or volume of ion-retention particles in each bed) to the number of ions in the fluid phase contacted with the particles (i.e., the concentration of salt in the feed stock). For some purposes, complete desalinization may not be required, while for other purposes, deionization to the extent of 0 to 1 to 2 p.p.m. may be required. Thus, for irrigation purposes, desalinization of the aqueous product down to 3000 p.p.m. of dissolved solids is permissible, whereas for domestic or household use, desalinization of the product down to 500 p.p.m. is generally permissible.

After attaining equilibrium between the resin in bed B4 with the ionic component in the ambient feed stream, additional feed stock entering bed B4 flows out of the downstream outlet of B4 into bed B3, in which at least a portion of the solid particles contain active ion-retention sites. The effluent leaving bed B4 cannot enter line 8 and flow into port P4 of the central distributing valve in the stage of the cycle illustrated in FIGURE 1, because no outlet channel in the valve plug Y is aligned with port P4 to provide an escape outlet through the valve plug Y. Similarly, the liquid displaced from the void spaces between the ion-retention particles in downstream beds B3 and B2 for the same reason must continue to flow in a downstream direction through the serially arranged beds, in the absence of an outlet from the beds through the central distributing valve. In each of the beds the incoming fluid stream contacts the solid ion-retention particles contained in the beds, the residual salt ions in the saline solution becoming bound to the anion-retentive and cation-retentive sites in the chemical structure of the particles, to the extent commensurate with their equilibrium properties. The saline fluid occupying the void spaces between the porous ion-retention particles and carrying with it the remaining anions and cations in solution (i.e., the interstitial fluid) flows through the particles which retain the ionic components in solution via a mechanism herein referred to as "ion-retention" in which both the cationic and anionic components became attached to and are retained by the chemically active sites within the composition of the particles which continue to be ion-retentive as long as active centers remain in its composition at the particular temperature and concentration equilibrium conditions. The farthermost downstream bed of the ion-retention zone (bed B1 at the stage of the cycle illustrated in FIGURE 1) contains resin in which the ion-retentive centers are nearly all active at the time that feed stock begins to flow into bed B4 (the feed stock inlet point being shifted in the direction of the freshly regenerated beds). Bed B1 accordingly, is capable of removing substantially all of the remaining ions from the effluent of bed B2; thereafter bed B1 becomes progressively more saturated with ions as the primary feed stock inlet changes from the bed B4 to bed B3, still more saturated as the feed inlet changes from bed B3 to bed B2 and further saturated when the inlet changes from bed B2 to bed B1. A sufficient number of such fixed beds in series (although not necessarily exceeding one in number) in contiguous, interconnecting relationship are provided in the ion-retention zone to effect complete desalinization of the salt solution, where the objective of the process is to produce a product consisting of substantially deionized or pure water issuing from the outlet of the last downstream bed of the ion-retention zone. The number of beds actually required in the ion-retention zone or the length of the series in aggregate depends upon the number of cation-anion-active centers in the ion-retention particles, the size of the particles, the rate of ion-migration into the particles, the depth of particles in each bed, the temperature of the feed stock, as well as other factors.

The ion-retention particles contained in each of the beds are composed of a water-insoluble solid, generally a resin of organic composition in which the cationically active centers capable of retaining the cationic portion of the dissolved salt(s), is an acidic radical attached to the organic structure of the resin and the anionically active centers, capable of retaining the anion of the salt(s) comprising the saline solution is a basic radical attached to an adjacent portion of the organic structure. The particles are preferably porous so that the saline solution not only occupies the void spaces between the ion-retention particles, but also flows into pores through the internal structure of the particles. The chemical composition of typical ion-retention particles having both anion and cation-retentive capacity will be set forth in the specifications and examples which follow. The ion-retention particles comprising the contacting agent in the fixed beds of the process flow are preferably finely divided, roughly spherical particles of substantially uniform size, in order to obviate channelling of the fluid flowing through the beds of particles. Although resistance to fluid flow through the contacting beds increases as the size of the particles decreases, the rate of ion-migration into the internal structure of the particle increases as the size of the particles diminishes. The particles are preferably of a size within the range of from about 10 to about 100 mesh and more preferably from about 20 to about 60 mesh, although larger sizes are sometimes preferred in order to enhance the flow rate of fluid through the column, while compensating for the resulting decrease in ion-retention capacity per volume of particles by increasing the depth or size of the beds. The maintenance of uniform flow with good distribution of the liquid is enhanced by the use of particles small enough to produce a significant pressure drop through the series of zones.

The non-retained portion of the aqueous feed stock (that is, the non-ionic portion thereof consisting of water from which the salt ions have been removed by anion-cation retention in the fixed beds) flows out of bed B1 (the last bed in the series of beds comprising the ion-retention zone of the process flow at the particular stage of the process illustrated by FIGURE 1) through conduit 9 into line 10, the effluent stream of bed B1 dividing into two portions: (1) a primary product stream (the net deionized water product of the process) which flows through line 10 into port P1, through internal channel 11 in rotating plug Y of valve 2 and thereafter flows through the axle portion of the plug into primary product line 12, and (2) a pump-around portion which provides a continuously cyclic fluid stream leaving the last downstream bed of the ion-retention zone and enters the first bed (B20 in FIGURE 1) of the next downstream series of beds at a higher pressure than the pressure in bed B1; the pump-around fluid portion of the effluent stream of bed B1 flows into line 13 and is discharged at a higher pressure by means of pump 3 into line 14 connecting with inlet conduit 15 of bed B20. Pump 3 which increases the pressure of the fluid stream to thereby ensure continuous fluid flow in a downstream direction is illustrated herein as being positioned between the outlet of bed B1 and the inlet of bed B20; however, the pump may be placed between any adjacent inlet and outlet in the series of interconnected beds, or between any adjacent inlet and outlet points of a continuous uninterrupted bed of solid particles. The proportion of the effluent stream of bed B1 for pump-around purposes is flow rate-controlled, depending upon the functional stage of the cyclic process in which beds B1 and B20 are involved. In general, the pump-around flow rate fluctuates widely, since this stream is at one stage of the cycle incoming feed stock, at another stage, secondary reflux (as here illustrated), concentrated brine at still another stage of the cycle, etc.; in each instance the flow rate may be different than the flow rate after the next succeeding shift of inlets and outlets. The quantity of deionized water entering bed B20 in the stage of the process illustrated in the diagram provides the critical process variable herein designated as "secondary reflux" for the secondary rectification zone, as hereinafter described.

As the various inlet and outlet streams flow into and out of the beds of particles, valve plug Y of the central distributing valve rotates (either continuously in uninterrupted motion or in intermittent impulses) in a clockwise direction at a rate determined by the total anion-cation retentive capacity of the particles in beds B4 to B1, inclusive, the flow rate of primary feed stock (salt water) into the process, and as also determined by the particular concentration of ionic components in the feed stock; that is, the rate of advancing the feed inlet point through the series of beds depends upon the ability of the system to produce a deionized water product or water product of substantially reduced ion content at the flow rates set for the process.

The rate at which the feed inlet point is advanced (as determined by the rate of rotating valve plug Y in the fluid distributing center 2) sets the rate of simulated circulation of the solid particles in the fixed beds of contacting agent in relation to the movement of the feed inlet point. The rate of solid "circulation" thereby established must be sufficient to accomplish "transport" of the ionic material held by the ion-retention particles from the ion-retention zone to the ion-desorption zone. It must also be adjusted so as to accomplish the maintenance of temperature zones which move through the serially interconnected functional zones at the same rate that the feed point progresses through the series of zones; that is, at a rate of simulated movement at which the zones appear to be stationary relative to the feed inlet point. A cool ion-retention zone thereby precedes the feed stock inlet point and a hot ion-desorption zone thereby precedes the desorbent inlet point (the hot and cold zones appearing to remain stationary relative to the inlet points) as these inlets shift in a downstream direction through the fixed beds. Compliance with both of these conditions assures maximum utilization of the economy of heat expenditure inherent in the process, but imposes certain limitations on the physical properties of the ion-retention particles which enable the selected material to be utilized in the process. More specifically, the relationship between the heat capacity and the ion-carrying capacity of the particles must be predesigned into the chemical composition and structure of the ion-retention particles to meet the foregoing requirements of the process, the temperature of operation and the concentration and type of ionic components in the feed solution. Under some circumstances a resinous ion-retentive material may meet the melting point, heat capacity, and the ion-carrying capacity required for the system. In other instances an inorganic ion-retentive material, such as solid particles of alumina, carbon, or clay containing the ion-retentive-active centers within the structure or on the surface of the particles may be required, as determined by the above factors. Failure of the ion-retentive medium to satisfy the relationship imposed between the ion-retention capacity and the heat retention capacity would reduce the efficiency of the process and require the addition of more heat to the process. It would not, however, render it inoperable. Further, if the ion retention capacity is too great relative to the heat-retention capacity, the properties of the solid can then be brought into "balance" by the admixture of a second particulate solid which is without ion-retention properties. If the ion-retention capacity is too low, the utilization of external heat over and above that required for a "balanced" adsorbent is required, or the rate of desorbent flow into the process may be adjusted to balance heat transfer and meet the heating or cooling requirements of the process. It is thus apparent that the process requirements with respect to heat balance and ion exchange capacity may be met by a variety of one or more mutually interdependent process control measures.

Value plug Y of the fluid distribution center continuously or intermittently rotates in compliance with a prearranged program therefor, permitting feed stock to flow through channel 5 in the valve plug as long as the channel continues to open into port P5 of the valve housing X and as long as deionized water product is allowed to flow from bed B1 into open channel 11 from port P1. However, as the openings in channels 5 and 11 gradually close by rotation of the valve plug to a position in which the solid portions of the valve housing X are opposite the openings into channels 5 and 11, the flow of feed stock into port P5 and the flow of deionized water product through port P1 and thence out of the process flow gradually decrease until no portion of either channel open into the respective outlet ports. The timing of the rotation of the valve plug Y is set and predetermined by the capacity of the ion-retention particles contained in the last bed (B1) of the series of beds comprising the ion-retention zone, the flow of feed stock into the first bed of the series continuing until just short of the equilibrium saturation of the ion-retention particles in bed B1 at the particular operating temperature and ion-concentration in the saline feed stock. At this point the flow of feed stock through channel 5 into port P5 is predetermined to stop, valve 2 being designed to provide that prior to the interruption of flow into port P5, the opening of channel 5 arrives at the opening edge of port P4 in the valve housing X; the fluid feed stock thereby commences to flow through port P4 into line 8 at the same time that the flow of feed into port P5 is diminishing by the solid portion 17 of the valve housing impinging across the opening of channel 5 of the valve plug. By virtue of line 8 connecting with conduit 18 between beds B4 and B3, line 8 and interconnecting conduit 18 become the feed stock inlet route for the feed stock entering bed B3.

At the same instant that port P5 no longer provides a connecting link between channel 5 receiving inflowing feed stock because of the rotation of the valve plug to the point where the solid portion 17 of the valve housing blocks the flow of fluid from channel 5 into port P5, port P1 is simultaneously closed and port P20 opens, allowing deionized water product to flow out of the outlet conduit 19 of bed B20 through line 20 which discharges the deionized water product into port P20, thence through channel 11, and line 12, as described aforesaid for the product outlet of bed B1.

At the instant that salt water feed stock flows into the feed stock inlet bed B3 (the flow into bed B4 being gradually reduced to nil as the flow into B3 increases) by virtue of the rotation of plug X of valve 2, serially arranged, contiguous beds B3, B2, B1 and B20 become established as the new ion-retention zone.

Concurrent with the entry of saline water feed into the inlet of bed B4, beds B20 and B19 serve as the so-called "secondary rectification" zone of the process flow. This zone lies in the path of continuous fluid flow between bed B1, the last bed in the series: B4 to B1 of the upstream ion-retention zone and bed B17, the first bed of the downstream desorption zone. A portion of the deionized water product (referred to herein as "secondary reflux"), comprising the effluent of bed B1, but not withdrawn as primary product through line 10 is forced to flow by virtue of the upstream pressure and the valve 16 restriction on the flow of deionized water through by-pass product withdrawal line 10 and into line 13. The resulting pump-around stream is thereafter continuously transferred by means of pump 3 and line 14 into inlet conduit 15 of bed B20, the first bed of the secondary rectification zone. The secondary reflux enters bed B20 at a constant rate and in a quantity sufficient not only to recover the sensible heat left in the ion-retention particles during the preceding desorption stage of the process cycle, but also to flush out of bed B20 any residue of fluid remaining in the void spaces between the solid ion-retention particles in bed B20. The latter fluid consists essentially of hot water regenerant left as a residue between the solid particles when bed B20 was one of the beds comprising the desorption zone during a preceding stage of the process cycle. The secondary reflux, by cooling the ion-retention particles in bed B20, thus prepares this bed for its next function when it becomes the last bed in the series of four beds comprising the ion-retention zone in the next shift of inlets and outlets. The interstitial fluid residing between the solid particles is thereby replaced with deionized water product at the temperature of the ion-retention zone and the heat retained by the solid phase by virtue of the downstream regeneration zone in a preceding stage of the cycle is transferred by heat exchange to the secondary reflux stream flowing into the downstream desorption zone where the heat is required to regenerate the ion-retention particles. A hot regeneration zone is thereby provided which precedes the upstream ion-retention zone in the continuous countercurrent movement of the simulated moving bed of solid particles against the fluid stream. Through such means the heat utilized in raising the temperature of the ion-retention particles to the regeneration temperature is recovered and conserved, maximizing the over-all efficiency of the process. It is evident that by suitable preadjustment of the flow rates of pump-around fluid and feed stock into the process by appropriate valve settings and by controlling the rate of advance of the fluid inlets and outlets into and from the contacting bed or beds, the zone in which the secondary reflex is heated to the regeneration temperature can be maintained in fixed spatial relationship to the feed inlet point, the number of beds or distance between the inlet of the desorption zone and the feed inlet being thereby maintained constant as both inlet points shift to downstream positions during each cycle of operation.

The secondary reflux stream, after removing, by displacement, any residual ionic component from the void spaces between the particles of the ion-retention particles in beds B20 and B19 and having attained by heat transfer with the hot ion-retention particles the temperature of these particles, and by countercurrent contact, having reduced the temperature of the particles to the temperature of the incoming secondary reflux the stream flows into interconnecting conduit 21, the downstream outlet of bed B19, and then into line 22 connecting with port P19 in the fluid distributing center 2. The fluid in bed B19 flows from conduit 21 into line 23, rather than into the immediate downstream bed B18 because line 22 empties indirectly through port P19 into channel 23 of the valve plug in which the upstream pressure is substantially less than the pressure in bed B18. This positive pressure head on the upstream side of the outlet is relieved through channel 23 which connects to the suction inlet of pump 25 through line 24. Pump 25 discharges the secondary reflux effluent into line 26 at a pressure substantially equal to the upstream pressure in bed B19, through externally fired heater 27, into line 28 which conveys the resulting heated stream of deionized water into channel 29 of fluid distributing center 2, thereafter flowing through port P18 in the valve housing X, through line 30 connecting with conduit 31 of bed B17, the first bed in the series of beds comprising the desorption or regeneration zone, which in the deionization process illustrated in FIGURE 1, is made up of beds B17 to B12, inclusive.

In the present desalinization process, it is evident that the source of the desorbent is from an internally-derived stream comprising the entire effluent of the upstream secondary rectification zone. The process, however, as will hereinafter be shown in the examples which follow, can also be operated on the basis of supplying an influent stream entering the heat exchange zone downstream from the secondary rectification zone from an external source, as required by the particular process.

The aggregate total space between the particles of solid in each of the beds, is herein referred to as "void volume," and the volume of secondary reflux introduced into bed B20 during the flow of feed stock into bed B4 is a process variable, depending upon the specific process involved. For some processes, the flow rate of secondary reflux is desirably maintained at a value less than one volume of fluid per volume of void space per shift of inlets and outlets and thus would provide a volume of secondary reflux less than the volume of liquid required to replace the resident fluid occupying the void spaces between the ion-retention particles (i.e., the interstitial fluid) in the first bed of the secondary rectification zone prior to the next shift in fluid inlets and outlets into and from the series of beds. For the sake of convenience of reference herein, the flow rates of the reflux streams involved in the present process flow (that is, both the secondary and primary reflux streams) a flow rate concept based upon "balanced reflux" is utilized herein, providing a convenient means of designating the flow rates of these reflux streams relative to the simulated flow of solid particles. "Balanced reflux," as utilized herein, expresses a flow rate equal to the proportion of interstitial fluid (that is, the fluid occupying the void spaces between the particles of solid) displaced by the reflux stream flowing into the first bed downstream from the reflux inlet during the period of time between successive shifts of the fluid inlet and outlet points along the line of flow. Thus, 100 percent of balanced reflux designates a flow rate in which the influent reflux stream will just clear the interstitial fluid from the void spaces between the particles of solid in the first bed downstream from the reflux inlet before the reflux inlet shifts to the next downstream bed. A flow rate of less than 100 percent of balanced reflux is said to be "under-refluxed," and "over-reflux" refers to reflux flow rates in excess of 100 percent of balanced reflux. In the desalinization process, secondary reflux flow rates are preferably maintained in excess of balanced reflux, generally from 100 to 250 percent, and more preferably, from 110 to 140 percent of balanced reflux. For other processes, as in the separation of aromatic or normal paraffinic hydrocarbons from other hydrocarbon types, in which it becomes desirable to prevent secondary reflux from contaminating desorbate effluent product, the secondary rectification zone is preferably under-refluxed and secondary reflux flow rates are generally from 65 to 100 percent, and more preferably from 80 to 95 percent of balanced reflux. Thus, the most advantageous secondary reflux flow rate utilized in any particular process is a variable process control factor, depending upon the requirements for the particular process.

In the present process flow, the secondary reflux stream flows successively downstream into beds B20 and B19 and thereafter continues to flow in toto (i.e., without interruption or diversion) into the downstream beds comprising the desorption or regeneration zone of the process. Therefore, the quantity of deionized water permitted to enter the secondary rectification zone is also (and pre-eminently) determined by the quantity required for regeneration of the spent ion-retention particles contained in downstream beds B17 to B12, inclusive. Thus, the source and flow rate of the desorbent stream is wholly dependent upon that which enters the desorption zone as secondary reflux effluent of the secondary rectification zone.

The rate and extent of regeneration of the ion-retention particles are controlled by the mutual effect of two process factors: temperature and the concentration of solute ions in the fluid surrounding the spent or partially spent ion-retention particles and occupying the void spaces between these particles. As the temperature of the desorbent in and around the particles increases, the loss of ions to the interstitial fluid increases and exceeds the rate of other ion-retention centers in the particles acquiring ions from the solution; however, the rate of "desorption" will again approach equilibrium with reabsorption of ions unless the temperature is further increased or the ion-concentration in the fluid surrounding the particles is further reduced. Hence, therefore, the spent or partially spent ion-retention particles entering the desorption zone lose retained ions to the desorbent fluid (water entering the desorption zone) even after the desorbent stream has become infused with a significant concentration of salt ions desorbed from the spent ion-retention particles in the upstream portion of the desorption zone, if the temperature of the fluid phase surrounding the particles is increased sufficiently to account for a positive shift in the ion-concentration equilibrium between the ions retained within the ion-retention particles and the ions in the fluid phase surrounding the particles. If, as a result of the increase in temperature of the fluid phase, the equilibrium is shifted sufficiently to cause the particles to give up ions to the fluid phase, desorption proceeds.

Regeneration of the ion-retention particles also occurs, even without an increase in the temperature of the desorbent, when the solute or ion-concentration in the surrounding fluid desorbent is decreased, the desorbtion or release of retained ions from the spent or partially spent particles depending in this case upon a Mass Action effect, in which the ions in high concentration on the particles migrate into the surrounding desorbent fluid (water) of low or nil ion-concentration. The desorption of retained ions or "regeneration" occurs at an optimum rate if both the temperature of the desorbent fluid is increased and the ion-concentration in the desorbent fluid is maintained at a low level, as in the present process in which the deionized water desorbent is heated to the maximum tolerable temperature and maintained at substantially the same temperature throughout the desorption zone.

The ion retention capacity of the heat exchange particles is predetermined and adjusted to provide an essentially balanced relationship between the ion-retention capacity and heat exchange capacity in both the secondary rectification and desorption zones; thus, when the flow rate of secondary reflux is sufficient to obtain the aforementioned heat exchange and residual fluid displacement effects, and these effects are both "balanced," this rate of flow, which also establishes the flow rate of desorbent into the downstream desorption zone, is adequate to provide sufficient desorbent to accomplish the desired regeneration of the ion-retention particles during the course of the desorption period.

The realization of maximum thermal efficiency (i.e., minimum consumption of heating or cooling utilities) in any particular process operated in accordance with the present flow pattern ultimately depends upon the use of an optimum flow rate of secondary reflux, as determined for a specific particulate solid utilized as heat exchange medium. The reason that the secondary reflux flow rate is such a critical process variable when the process is to be operated to realize maximum thermal efficiency, is based upon the necessity of maintaining equanimity between the heat transferred from the solid to the fluid phase in the secondary rectification zone and the heat transferred from the fluid to the solid particles in the downstream heat reception zone at the predetermined optimum temperature for the process.

In the desalinization process embodiment of the basic process the heat transfer capacity of two beds of contacting material is sufficient to reduce the temperature of the solid particles to the same temperature as the cool stream of secondary reflux (deionized water) entering the secondary rectification zone from the outlet of the ion-retention zone. In a process flow arrangement in which heat transfer is the primary or only process objective, the flow of secondary reflux is preferably maintained at not more than that rate which will be sufficient to recover substantially all of the heat in the solid particles, as indicated by the attainment of temperature equilibrium between the solid particles and the secondary reflux at the inlet of the secondary rectification zone. One of the ultimately critical process variables in the present process, therefore, is the maintenance of the secondary reflux flow rate at a value which will prevent the introduction of a greater volume of secondary reflux than the minimum required for complete recovery of heat from the solid particles, unless a secondary objective is achieved at a greater flow rate, as, for example, to more efficiently desorb ions from the ion-retention particles in the desorption stage of a desalinization process flow. The latter function of the secondary reflux whereby the particles of solid are cooled prior to their entry into the relatively cool first feed stock contacting zone is the basis for the alternative designation of the secondary rectification zone as a "Heat Release" zone in which the heat stored in the particles of solid is released or transferred from the solid phase to the liquid secondary reflux stream which carries the recovered heat into the downstream desorption zone.

The efficiency of heat transfer in any heat exchange process, including the process of this invention, increases as the temperature differential between the high-temperature solid phase and the low-temperature fluid phase increases. Accordingly, the temperature at which the downstream desorption zone (or in its broadest concept, the heat reception zone) is maintained is preferably the maximum tolerable upper limit for the particular process and the temperature at which the sorption zone (or heat release zone) is maintained is preferably the minimum lower limit for the process in order to maximize the temperature differential therebetween. This preference also has important considerations in processes which embody an ancillary reaction or conversion (whether chemical or physical) in the high-temperature and/or the low-temperature zone of the process flow, as in the desalinization process flow where the desorption of ions from the ion-retention particles to regenerate the resin is also directly proportional to the desorption or regeneration temperature. Accordingly, the desorption zone of the desalinization process is also maintained at the maximum permissable temperature during the entire path of flow for the additional reason that regeneration of the solid ion-retention particles is thereby maximized, but generally limited by the physical characteristics of the particles, such as their melting point. However, as regeneration proceeds, the endothermic heat of desorption reduces the temperature of the stream, requiring the addition of external heat to the stream in order to maintain the desorption of ions from the particles at a maximum rate and efficiency. In addition, it is evident that as the concentration of ions in the desorbent stream (an aqueous salt solution at any downstream point beyond the desorbent inlet) increases in a downstream direction, the ion-concentration in the solid phase also increases in a downstream direction and ions will continue to enter the aqueous phase at any given desorption temperature as long as equilibrium is displaced in the direction of solid to liquid. Whether the ions migrate from the ion-retention particles into the desorbent, or vice versa is determined by equilibrium relationships between the fluid and solid phases, as expressed in the following equation:

Rising temperature
Ions in the ion-retention particles ⇌ Ions in the aqueous desorbent
Falling temperature The extent to which the equilibrium can be displaced to the right side of the equation is ultimately determined by the temperature of the desorbent at the point that it last contacts the ion-retention particles before the desorbent stream is withdrawn from the desorption zone. Assuming equilibrium between the solid particles and fluid desorbent with respect to both temperature and ion-concentration, ions will migrate from the solid phase into the liquid desorbent phase as long as the liquid phase is not in equilibrium with the solid phase and the unbalanced condition is favorable for such positive migration. However, if the temperature of the desorbent falls extensively (i.e., beyond the point of ionic equilibrium with the ion-retention particles at the particular ion-concentration in the interstitial fluid), negative migration occurs and the flow of ions is from the solution phase to the solid particles. Therefore, as the desorbent stream flows through the desorption zone from bed B17 into bed B16, B15 and finally into bed B14, its temperature has ben reduced as heat energy is converted into chemical potential energy in the ion-retention particles. Since optimum desorption of ions from the particles and maximum regeneration of the ion-retaining potential of the solid particles occurs at the maximum tolerable temperature limit for the solid, the now partially cooled desorbent stream is preferably once again raised in temperature to the maximum tolerable limit at some advanced point along the line of desorbent flow, for example by incorporating a second external heat exchanger in the process flow during the desorption stage.

In the desalinization process illustrated in FIGURE 1, the second desorbent heater is inserted in the desorption or regeneration zone between the fourth and sixth beds of the desorption zone, as illustrated in FIGURE 1, although it is to be understood that more than one additional heater may be incorporated into the process flow, as desired, for example, to maintain the desorption temperature more constantly at the maximum tolerable level and eliminate larger fluctuations in the temperature of the stream. For this purpose, the effluent stream of bed B14 (or any portion thereof), flowing into interconnecting conduit 32 is withdrawn from the cycle through line 33, through port P14 in the valve housing X of the fluid distributing center (valve 2), thereafter entering channel 34 which conveys the withdrawn portion of the desorbent stream into the hub of the fluid distributing center which directs the stream into line 35 and thereafter into the suction inlet of pump 34. It will be noted that bed B14 is the first downstream bed in the series from B17 to B14 that connects with outlet channel 34 through line 33 and port P14; all intermediate beds between beds B18 and B14 have their outlet ports blocked by the solid portions of the rotating valve plug and thus remain in fluid-sealed relationship to the ports P17, P16 and P15. Pump 36 directs the desorbent fluid stream at a higher pressure into line 37 connecting with heater 38 wherein the withdrawn portion of the desorbent stream is heated sufficiently to raise the temperature of the desorbent stream, preferably to the highest limit tolerable by the resin, as aforesaid.

The heated desorbent stream, now heated to a higher energy (temperature) level necessary for effecting the work of removing ions from the partially spent and completely spent resin in the next succeeding downstream beds of the regeneration zone flows from heater 38, through line 39 into the hub of the valve plug where line 39 connects with channel 40, the latter channel feeding the heated desorbent into port P13 and thence into line 41 and interconnecting conduit 42 which is the inlet to bed B12 in which the ion-retention particles contain more solute solid and fewer active centers than the particles in bed B14. The desorbent stream continues its downstream flow through bed B12, then through beds B11 and B10, successively encountering fixed beds of ion-retention particles of greater ion content in the direction of flow.

In the present desalinization process it is found that a greater over-all economy is realized by recovering a major proportion of the heat from the high temperature desorbent stream at the downstream end of the desorption zone by heat exchanging the hot desorbate (a concentrated brine solution at this point) with the ion-retention particles than to remove the desorbent from contact with the ion-retention particles before extracting the sensible heat from the particles. Thus, referring again to the accompanying FIGURE 1, the movement of ions from the solid ion-retention particles into the desorbent phase (i.e., desorption) takes place in the portion of the process cycle designated as the desorption zone, including beds B17 to B12, inclusive.

After passing through bed B12, the stream of desorbent in the form of a concentrated brine is no longer at the maximum desorption temperature acquired by reheating the desorbent stream in heater 38. The stream has again dropped in temperature because of the aforementioned endothermic desorption of ions from the ion-retention particles in bed B12 and for the additional reason that the desorbent stream flows downstream in countercurrent flow relationship to progressively cooler particles advancing upstream as a simulated moving bed. After leaving bed B12, therefore, the desorbent stream acts in the capacity of a heat carrying fluid to preheat the solid ion-retention particles which in the succeeding upstream stages of the process cycle will undergo high temperature desorption. Downstream beds B11 and B10 are accordingly designated as comprising a "Heat Reception Zone" wherein the heat contained in the liquid desorbent phase is recovered therefrom and stored in the solid particles from which the heat is capable of being redelivered to the process cycle for performing the useful work of desorption and regeneration of the ion-retention particles.

The number of beds comprising the heat reception zone is a relatively important controllable process variable, since the amount of heat extracted by heat exchange from the ion-retention particles must be critically controlled in order to place a limit on the migration of ions from the liquid desorbent phase to the solid particle phase as the liquid stream becomes cooler and progressively more favorable to the retention of ions by the solid particles, in accordance with the equilibrium equation hereinabove set forth. The amount of heat recovered from the aqueous desorbent and its corresponding drop in temperature is determined by the quantity of solid particles heat exchanged with the perfluent desorbent, a quantity directly proportional to the number of beds assigned to the heat reception zone. Although the solid phase in beds B11 and B10 which make up the heat reception zone may actually gain in total ion content as heat is transferred from the hot desorbent brine to the particles of solid, the loss of ion-retention capacity occasioned by acquiring an additional burden of ions resulting from the drop in temperature of the desorbent stream is economically more than balanced by the recoupment of heat from the desorbent stream. The favorable economic gain which accompanies the recovery of heat from the desorbent by heat exchange with the ion-retention particles, however, does not continue indefinitely in the direction of complete heat recovery from the desorbent and to the limit of temperature equilibrium with the ion-retention particles leaving the ion-sorption zone of the process flow where the temperature of the solid phase is the lowest in the cycle. At an intermediate point between the maximum desorption temperature and the lowest solid phase temperature in the ion-sorption zone (generally at the lower end of this temperature range) the rate of gain in ion content by the ion-retention particles accelerates rapidly; hence, the economic gain accompanying the further recovery of heat is not commensurate with the burden of regeneration accompanying the gain in ion content by the ion-retention particles and it is at this point in the series of beds comprising the heat reception zone that the desorbent stream is advantageously withdrawn from the process flow, out of contact with the ion-retention particles. In the accompanying FIGURE 1, the bed from which the cooled desorbent stream is withdrawn is bed B10, the last bed in the heat reception zone. The concentrated brine solution which characterizes the desorbent effluent at this point is withdrawn from connecting conduit 43 between beds B10 and B9 and diverted in part into line 44 for removal from the process through the fluid distribution center and in part into downstream bed B9 as primary reflux at a specifically controlled rate of flow, as hereinafter more fully described.

The number of beds or the proportion of total inventory of ion-retention particles set aside for the heat reception zone of the process flow determines the temperature of the effluent desorbate stream, since the latter temperature varies directly with the quantity of solid particles heat exchanged with the desorbent stream. The temperature at which the desorbate effluent is withdrawn is in part determined by ancillary factors, such as the availability of and cost of fuel for heating the desorbent stream in external heaters 27 and 38 involved in the process, the proximity of the present process apparatus to the source of feed stock, thereby determining the cost of pumping the stock to the desalinization unit and other cost factors. Thus, when the unit is to be operated at a site close to the seacoast, but fuel for maintaining the desorbent stream at the maximum upper limit for desorption is relatively expensive, a net yield of 50 percent pure water product may be satisfactory when as much heat as possible must be recovered from the desorbent to render the process economically feasible. In such case, the quantity of ion-free desorbent water admitted as secondary reflux into the desorption zone is greater than the case in which the desorbent stream is maintained at a high-temperature level. The ion-concentration in the desorbent phase is maintained at a low level by initially charging a sufficient quantity of water as desorbent to maintain the aqueous phase as a dilute solution; ion migration from the solid to the fluid phase is not solely dependent upon maintaining the desorbent phase at the downstream end of the desorption zone at an elevated temperature, as would be the case if the ion-concentration in the desorbent phase were relatively high. Thus, more feed stock can be pumped into the system and effluent desorbent pumped out of the apparatus at a higher rate than would be the case if an appreciable proportion of the operating cost of the process was represented by pumping costs, as in the case of a desalinization unit located appreciably inland. If, on the other hand, the cost of fuel were relatively low and the cost of pumping utilities represented an appreciable proportion of the total operating costs for the process, the preferred method of operation would be the recovery of a maximum proportion of the water from a given quantity of feed stock. In this event, the desorbent effluent could be withdrawn from the process at a relatively higher temperature in lieu of using a smaller proportion of the ion-free water product as desorbent (secondary reflux) source. The salt content of the desorbent effluent could attain as high a level as 15 weight percent, for example, producing a yield of ion-free water of about 79 percent, based upon a sea water source of feed stock which contains about 3.3 percent by weight of inorganic salts.

The heat input necessary to maintain the temperature of the fluid desorbent stream at the optimum regeneration temperature (usually the maximum tolerable temperature for the particular ion-retention composition) is preferably introduced at several points along the line of flow in the desorption zone to thereby maintain the temperature at the optimum upper limit as heat is consumed by the endothermic desorption. The most direct means for introducing heat into the desorbent stream along the desorbent line of flow comprises removing the desorbent stream out of the process flow and raising its temperature to the maximum tolerable limit for the process by heat exchange in an external heater, as aforesaid, and as illustrated in FIGURE 1. Additional heat can also be periodically introduced into the desorbent stream as the latter flows through the desorption zone by introducing two or more high-temperature streams (e.g., superheated water) into the process flow at two or more points along the line of flow and such alternative measures are contemplated within the scope of this invention.

Although the initial heating of the desorbent stream to the desorption temperature and the subsequent restoration of the temperature to this maximum level is described as taking place in two stages (i.e., two external heaters, 27 and 38), any number of stages may be provided in the programming schedule to restore the temperature of the desorbent stream to the desorption limit, as for example, by providing a heater between each bed in the series of beds comprising the desorption zone, thereby maintaining the desorption temperature more constantly at the maximum upper limit and acquiring the advantage of maximum desorption rate. The use of multiple heaters would be established by comparing the cost and operating expense of an additional heater with the fuel saving obtainable by its installation.

The advantages of the present cyclic process flow, in which the fixed masses of ion-retention particles effectively flow countercurrently, in simulated moving bed relationship to the fluid stream, is the fact that partially regenerated particles from which at least a portion of the ions retained in the solid particles have been displaced into the interstitial aqueous phase (desorbent water) surrounding the solid ion-retention particles meet progressively more ion-free desorbent as the bed becomes a progressively more upstream bed in the regeneration or desorption zone. The masses of ion-retention particles progressively move into desorbent of progressively lower ion-concentration by virtue of the succeeding shifts of the desorbent inlet in a downstream direction as the functional zones progress through each cycle in the process flow. This desirable countercurrent relationship ensures the first contact of the least regenerated ion-retention particles with desorbent having the least potential regenerating ability (i.e., with desorbent having the highest ion-concentration and lowest temperature), while simultaneously, in a further upstream bed, the particles in the most advanced state of regeneration are contacted with the least ion-contaminated desorbent having the greatest capacity to deionize and regenerate, thereby constantly unbalancing the equilibrium between the ions in the solid phase and the ions in the aqueous phase and providing a constant, positive driving force in the direction of complete desorption of ions and regeneration of the ion-retention particles. In this manner the ion-retention particles are relieved of the last trace of sorbed ions and the particles emerge from the upstream end of the desorption zone fully regenerated, if a sufficient volume of desorbent is charged into the desorption zone to provide the required ion-desorption capacity and the supplemental influence of temperature is sufficient to consummate the regeneration during the residence of the ion-retention particles in the desorption zone.

The combined desorption and heat reception zones are depicted for illustrative purposes only as a serially arranged system of eight beds: B17 to B10 in which the necessary heat transfer and ion-displacement operations are effected. However, for saline waters of lower ion-concentration, fewer beds will be required to effect the same degree of desalinization, whereas for saline water of higher ion-concentration, a greater number of beds (i.e., a greater total aggregate quantity of ion-retention particles) will be required in the desorption zone to realize the same degree of desalinization and ion-free water production. For other types of processes, employing other solid heat exchange particles, a greater or lesser number of beds will be required, depending upon the particular process and the heat exchange medium utilized in the process.

In the illustration of a typical desalinization process flow in FIGURE 1 of the accompanying diagram, the outlet of bed No. 10 is shown as the point in the desorbent path of flow from which the desorbent stream is withdrawn. This point was selected with reference to a particular ion-retention resin, exemplified in the examples which follow; for ion-retention particles of other compositions having different heat and ion-retention capacities, the point of desorbate withdrawal from the desorption zone will be different, depending upon the upper temperature limit which the ion-retention particles will tolerate, the rate of ion transfer from the solid particles to the liquid desorbent and other process factors affecting heat exchange and ion migration. The placement of the cooled desorbent outlet at the outlet of bed B10 is therefore illustrative, although it may also be actual.

The decorbate stream removed from bed 10 through connecting conduit 43 and line 44 leaves in its upstream wake regenerated ion-retention particles, heated to the high temperatures required for regeneration, a major proportion of the heat in the hot desorbent stream having been transferred to the ion-retention particles advancing upstream toward bed B17. The heat contained in the desorbent stream flowing in a downstream direction from bed B17 is thereby extracted by and stored in the fixed beds of ion-retention particles by virtue of the resulting heat exchange with the desorbent. As the downstream fixed beds filled by heated particles of solid move upstream into the positions occupied by beds B19 and B20 in FIGURE 1 (i.e., by virtue of the subsequent shifts in the inlet and outlet points), the heat stored in the mass of solid ion-retention particles is imparted to the influent stream of desorbent, charged into the desorption zone as cool secondary reflux.

Although the internally derived stream of deionized water (the effluent stream of the secondary rectification zone) constitutes the generally preferred source of desorbent in the process flow of a desalinization unit, it is nevertheless feasible and in some cases may be preferred, to change separate streams of hot desorbent water at several points along the line of flow in the desorption zone, and to withdraw desorbate brine from a downstream outlet after flowing through one or more intervening beds, particularly when heat is readily available at low cost.

The desorbate effluent which may be utilized as a by-product or secondary product of the present desalinization process and as a source of brine from which salt may be crystallized by further evaporation of the concentrated desorbate, if desired, is withdrawn in part, as aforesaid, from outlet conduit 43 connecting bed B10 with downstream bed B9. The remainder, comprising an important process stream of the present flow arrangement and herein referred to as "primary reflux," is permitted to flow continuously into bed B9, which is the first bed of the series: B9 to B5 constituting the downstream primary rectification zone of the cyclic process flow. The portion of the cooled brine stream to be withdrawn from the process as by-product flows into interconnecting conduit 43 and thereafter into line 44 which is the first outlet available to this fluid stream along the series of beds in the desorption-heat reception zones. The effluent brine thereafter flows into port P10 opening into channel 45 in the valve plug of fluid distribution center 2 and from channel 45 into line 46 connecting with the internal end of channel 45 in the hub of plug Y. Brine effluent line 46 contains valve 47 which controls the rate of withdrawing brine product from the process, but in so controlling the effluent flow, the valve thereby predetermines the flow rate of primary reflux into bed B9, since the portion, not withdrawn from the process, remains in the process flow and continues to flow into the downstream beds of the primary rectification zone. The setting of valve 47 remains constant as the valve plug continuously rotates in counterclockwise direction and determines the flow rate of primary reflux into the primary rectification zone as each bed attains this relative position in the cyclic flow arrangement.

The principal reason for permitting the stream of primary reflux to flow continuously from the last bed of the heat reception zone, B10, into the next downstream bed B9 of the primary rectification zone is to change the composition of the interstitial fluid occupying the void spaces between the particles of solid ion-retention particles in the first downstream bed beyond the outlet of the brine concentrate to that which will be withdrawn from the downstream bed after the next shift in effluent outlets and feed inlets. The rate of primary reflux flow into the primary rectification zone is adjusted (e.g., as previously indicated by controlling the setting of valve 47 in line 46) to effect replacement of the fluid occupying the void spaces between particles of solid in preferably not substantially more than the first downstream bed therefrom, or bed B9 in FIGURE 1, before the next shift in fluid inlets and outlets of the series of beds in desalinization unit 1. Were the flow rate of primary reflux, on the other hand, substantially greater than balanced reflux, the concentrated brine would eventually, over a prolonged period of operating the process, enter downstream bed B5, the last bed interposed between the ion-retention zone in which the solute concentration in the interstitial fluid phase is not greater than the primary feed stock and bed B9 wherein the fluid phase is a concentrated brine. It is obvious that if the primary reflux flow rate were to be much greater than balanced reflux, the concentrated brine of the primary reflux stream would enter the ion-retention zone (bed B4) and unnecessarily increase the ion load on the ion-retention particles, thereby, in effect, recycling a portion of the desorbed ions in the process flow. In order to prevent any primary reflux or its upstream pre-mix or diffusion mixtures from entering the ion-retention zone (primary feed stock contacting zone), the primary rectification zone is made up of at least two and more preferably, at least five beds (as illustrated in FIGURE 1) to thereby interpose, in effect, a safety control zone between the outlet of the first bed of the primary rectification zone and the inlet of the ion-retention zone.

The rate of primary reflux flow into bed B9 is dependent upon the particular process being effected in the present unit. For desalinization the primary reflux flow rate is preferably equal to and not substantially greater than that rate which will just replace the institial fluid (i.e., the fluid occupying the void spaces between the ion-retention particles) in bed B9 during the period of time that primary feed stock flows into bed B4. This rate of flow, which is approximately equal to or more preferably, slightly greater than that rate which will provide balanced reflux in bed B9 is nevertheless somewhat less than that volume which would otherwise advance the concentrated brine solution comprising this portion of the desorbate beyond the outlet of the primary rectification zone (i.e., from bed B5) but will clear bed B9 of fluid more concentrated than sea water feed stock, including any desorbate concentrate which premixes with the interstitial fluid at the interface with the interstitial fluid. If, on the other hand, the primary reflux flow rate is limited to balanced reflux, the volume of primary reflux would replace only the interstitial fluid in the next adjacent downstream bed by the time that the primary reflux inlet is shifted to this bed. However, by virtue of such primary rectification, the fluid which will be withdrawn from bed B9 after the next shift of the inlets and outlets into and from the process flow will have the same composition as the desorbate stream currently withdrawn from bed B10, thereby eliminating any appreciable fluctuation in the composition of this effluent by-product after the next shift in fluid inlets and outlets of unit 1. The interstitial fluid in the beds immediately downstream from the desorbate outlet is essentially feed stock of much lower salt concentration than the concentrated brine desorbate, since these beds were last previously recipients of primary feed stock as component beds of the sorption zone; that is, prior to their simulated moving bed advancement upstream into the primary rectification zone. Therefore, it become desirable to gradually change the solute concentration in the interstitial fluid within the void space before these beds advance into the positions of the upstream heat reception zone in which the concentration of solute in the interstitial fluid is much higher. The gradual change in interstitial fluid composition prevents structural stresses from developing in the ion-retention particles, a result which might otherwise occur.

A further objective of the provision for a primary reflux in the present process flow, whether for desalinization or for other types of processes, such as adsorption, employing a high-temperature desorption stage in the process cycle, is the preparation of the next downstream bed adjacent to the heat reception zone for the fluctuation in temperature which will occur when the outlet for the desorbate effluent (brine concentrate in the desalinization process illustrated in FIGURE 1) is shifted to the next downstream bed. Although a major proportion of the heat carried by the desorbate stream at the desorbate effluent outlet (bed B10 at the stage of the process illustrated in FIGURE 1) has been heat exchanged with cool ion-retention particles advancing upstream from the ion-retention zone, the temperature of the desorbate stream withdrawn from the downstream outlet of the heat reception zone is considerably above the datum temperature (i.e., the cool primary feed stock inlet temperature) at which the ion-retention particles would be, except for the preheating these particles receive by the primary reflux. In the absence of the primary reflux provision in the process flow, the ion-retention particles would be required to not only increase in temperature abruptly as the desorbate outlet was shifted to the next downstream bed, but the change in temperature would also be accompanied by a simultaneously sudden increase in solute concentration in the interstitial fluid. The preferred flow rates of primary reflux, particularly for desalinization, therefore, are from about 0.60 to about 0.95 (60 to 95%) of balanced reflux.

Certain types of processes, however, are advantageously operated when the flow rate of primary reflux is greater than 100 percent of balanced reflux. Typical of such applications of over-reflux of the primary rectification zone are such processes as ion fractionation, utilizing a feed stock comprising an aqueous solution of two or more ions of different ion-retentivity. Such ion fractionation processes generally and preferably involve the circulation (simulated) of excess ion-retention particles and primary reflux flow rates greater than balanced reflux, for example, from 110 to 250 percent (1.1 to 2.5) of the rate represented by balanced reflux. Under such conditions, the primary reflux flowing into the ion-retention zone would be composed principally of selectively sorbed ion(s) and would provide an operation analogous to the stripping vapors in a fractional distillation column. Typical specific applications of such processes would be the recovery of magnesium salts from sea water or the removal of uranium ions from its ionic contaminants.

The primary reflux portion of the desorbate stream entering bed B9 (after recovering a major proportion of the heat content of the desorbate effluent in the heat reception zone, as heretofore described), is further heat exchanged with the ion-retention particles occupying bed B9 and the succeeding downstream beds B8, B7, etc., becoming progressively cooler as it flows downstream and meets progressively cooler resin in its path of flow. The primary reflux stream also purges the residue of primary feed stock (interstitial fluid) from the void spaces in the serially arranged downstream beds, all of the latter fluid eventually flowing into the ion-sorption zone continually ahead of the concentrated brine primary reflux, as aforesaid. Since the simulated flow of solid particles which have an almost infinite heat exchange surface, relative to the fluid phase, is essentially countercurrent to the flow of hot fluid in the heat transfer zones, substantially all of the heat (i.e., at any temperature above the datum temperature of the primary feed stock) is effectively recovered by the fluid stream from the hot particles of solid in the heat release zone and by the cold particles from the hot desorbate stream in the heat reception zone, thereby conserving most of the heat initially introduced into the process. Essentially the only heat irretrievably lost from the process flow is that dissipated by radiation from high-temperature surfaces to the surrounding atmosphere, the heat of ion-absorption or retention when the regenerated ion-retention particles contact primary feed stock solution in the cool ion-retention zone and that quantity of heat lost in the desorbate effluent products leaving the process flow at a temperature higher than the datum temperature of the primary feed stock. As heretofore explained the temperature of the effluent desorbate stream at the point of withdrawal for this stream from the beds of ion-retention particles undergoing desorption or regeneration must be somewhat higher than the datum temperature to prevent re-adsorption of ions from the desorbent by the ion-retention particles.

As each of the beds in the ion-retention zone move progressively upstream, the ion-retention particles in the beds of this zone become progressively more spent and as the bed moves into the last position in the series of ion-retention beds (such as bed B4 in FIGURE 1) the ion-retention particles in the bed have essentially attained ionic equilibrium with the primary feed stock at the cool temperature and ion-concentration maintained in the ion-retention zone. However, as the bed moves out of the ion-retention zone, as bed B5 has in the illustration provided in FIGURE 1 and progressively advances to more upstream positions in first the primary rectification zone and then in the heat transfer zone, the ion-retention particles meet progressively hotter, more concentrated saline solutions. The rising temperature holds in check the further acquisition of solute ions by the ion-retention particles which would normally be promoted by the higher salinity of the aqueous desorbent and in fact, the temperature must be sufficiently high to result in a net loss of ions from the particles by desorption. The critical point in the upstream advance of the beds toward the desorption zone is the point at which concentrated brine desorbate is withdrawn from the process flow, since it is at this point that the desorbent stream is giving up its solute ions to the ion-retention particles in a region of generally falling temperatures which tend to enhance the migration of ions into the ion-retention particles. On the upstream side of the desorbate withdrawal point, no problem of ion readsorption by the ion-retention particles presents itself, since the beds moving upstream from the point of desorbate withdrawal meet progressively more dilute and progressively hotter desorbent, both factors tending to effect desorption of ions from the ion-retention particles and migration of ions into the desorbent phase. In the farthermost upstream bed in the desorption zone, the ion-retention particles, now substantially regenerated, meet essentially ion-free water at the maximum tolerable desorption temperature, conditions which provide the greatest desorptive drive. Accordingly, desorption of ions from the ion-retention particles and regeneration thereof proceed to completion, the particles can be advanced further upstream into the secondary rectification zone in which the interstitial fluid is ion-free water and then reduced in temperature to the feed stock inlet level without undergoing any degree of deactivation whatever. Downstream from the point of desorbate withdrawal and generally, one or more beds upstream from the desorbate withdrawal point, the ion content of the solid particles tends to rise and the concentration of ions in the desorbent tends to fall because the temperature of the desorbent at this point in the process flow has been reduced via heat exchange with the solid particles to a level at which the equilibrium shift is from the solid to the liquid phase (i.e., the concentration of ions in the solid exceeds the equilibrium point relative to the concentration of ions in the desorbent). If at this point, additional heat were to be added to the desorbent, as, for example, by means of an additional external heater the equilibrium point would be shifted further downstream and the desorbate withdrawal point can also be shifted to a further downstream point.

The somewhat critical temperature at which the desorbate stream is withdrawn from the process flow, which at any given desorbent rate of flow determines the yield of ion-free water product from the process, will depend upon the physical properties and chemical composition of the ion-retention particles and primarily upon the minimum datum and maximum desorption temperatures employed in the process, the latter conditions establishing the McCabe-Thiele equilibrium diagram for the salt to water and salt to ion-retention particle composition relationships. For an ion-retention particle of resinous or organic composition, an upper tolerable temperature limit of 180° F. for the resin would be typical; assuming a typical feed inlet temperature of about 60° F., the desorbate stream might be withdrawn from the process flow at an intermediate temperature of about 110 to 120° F. For inorganic ion-retention particles, the upper temperature limit is increased, simultaneously increasing the rate of desorption and Carnot efficiency, without increasing the lower temperature limit at which the desorbate must be withdrawn from the process.

When the process of this invention is operated in accordance with the procedure hereinabove described, each of the functions occurring in each of the five zones of desalinization unit 1, occur substantially simultaneously as plug Y in the fluid distributing center 2 is continuously rotated in a clockwise direction, as illustrated, the plug of valve 2 being rotated at a predetermined rotational speed which will permit the intended function in each of the beds to attain substantial equilibrium.

At a given instant of time thereafter, determined by the period required to complete the function intended in each bed, the valve plug in the fluid distribution center rotates until the inlet and outlet points have advanced to the next adjacent downstream bed and each becomes an upstream bed with respect to the fluid stream continuously flowing in a downstream direction. Thus, if at any given instant, bed B4 is the point which first contacts the fresh feed stock introduced into the process, after a predetermined period of time thereafter, following a sufficient interval to permit plug Y in the fluid distributing valve to complete $\frac{1}{20}$ of its rotation, bed B3 becomes the point of first contact with the feed stock and bed B4 becomes the last downstream bed in the series of beds comprising the primary rectification zone of the process flow. Thereafter, beds B3 through B1, B20, B19, B18, etc., back to B4 become, successively the beds of first contact and the functions of the beds vary in accordance with the prearranged pattern or program set forth for the entire series.

It will also be noted that as the feed inlet continuously shifts, the primary product outlet, the desorbent (secondary reflux) inlet, the desorbate brine concentrate outlet and the primary reflux inlet also shift in the same aliquot portion of the total cycle (i.e., in equal increments) and as these points shift, the composition of the fluid stream at various points in the column and the composition of the ion-retention particles in the beds also varies. The point of introducing feed stock into the process flow ultimately arrives again at the point in the cycle of operation where the feed stock was initially charged at the beginning of the process cycle, thus continuously repeating the process cycle.

The ion-retention particles contained within the functional beds of the present process may be a substance of organic or inorganic composition and may be a material of uniform composition or comprise a mixture of several species of different compositions. Thus, the particles may be a resin of uniform composition containing both cation- and anion-retaining radicals or groups, or may be made up of a water-insoluble resinous matrix containing both anion-exchange and cation-exchange, water-insoluble resins dispersed throughout the matrix, as for example, powdered mixed anion-exchange, cation-exchange resins fused into discrete particles. The ion-retention particles occupying each zone or bed of the process may also comprise a heterogeneous arrangement of ion-exchange resins, such as a mixture of particles, each containing either cation-reactive groups or anion-reactive groups intimately mixed or placed in layers throughout each of the beds. Such particles are useful in the separation of ionic mixtures containing two or more solute species, in one of which a strong cation may be exchanged with a strong cation exchange resin and in the other of which a strong anion may be exchanged with a strong anion exchange resin. The preferred resins utilized in the ion-retention adaptation of the present process for the resins containing both anion and cation-reactive groups in the same resin particle and within molecular distances of each other, the resin therby providing for even distribution of the reactive groups throughout the bed of resin particles. For the treatment of some ion-contaminated water streams and feed stocks, certain cationic and anionic-reactive groups are preferred with close proximity of both groups in the same resin matrix. The resins containing both cationic and anionic radicals in the same resin matrix are preferred not only because of their effectiveness in the present ion-retention process but for the additional reason that these resins are capable of undergoing regeneration readily and without large temperature differentials between the ion-retention and particle-regeneration zones.

One of the typical water-insoluble resins contemplated herein, containing both anionic and cationic-reactive groups in the structural matrix, is conveniently prepared by copolymerizing a reactant monomer containing monoethylenic unsaturation with a different reactant monomer containing polyethylenic unsaturation and which upon cross-polymerization produce a cross-linked structural matrix of high molecular weight and water-insolubility. Thereafter, either an anion-reactive or cation-reactive group is substituted on the water-insoluble resin structure by chemical reaction of the resin with an appropriate reagent capable of introducing the anion-reactive and/or cation-reactive group, and subsequently polymerizing in situ within the structure of the resulting resin molecule one or more other unsaturated monomers containing the complementary anionic or cationic groups.

The copolymer base structure on which the anion-reactive and/or cation-reactive groups or radicals are hung, is preferably formed by copolymerizing from 80 to 99 percent by weight of one or more monovinyl aromatic hydrocarbons of the benzene series with from 20 to 1 percent of a divinyl-substituted aromatic hydrocarbon of the benzene or naphthalene series.

The resulting water-insoluble resinous product produced by the copolymerization of the foregoing aromatic reactants, is thereafter converted to a resin containing both cationic and anionic-reactive groups by involving the copolymer in a series of reactions which successively and separately introduce the cation-reactive radical and the anionic-reactive radical into the structure of the aromatic nuclei comprising the copolymer, usitable anion-reactive radicals include the substituted nitrogen bases, such as the quaternary ammonium group in which the N-substituent groups are selected from the lower alkyl (that is, methyl, ethyl and propyl) and/or ar-alkyl radicals which produce particularly strong nitrogenous bases which become effective anion-reactive groups. Another group of nitrogenous bases which yield active anion-exchange radicals are the heterocyclic nitrogen compounds and their N-substituted derivatives. Of the nitrogenous base anion-axchange radicals utilizable as the anion-reactive portion of the resin structure, one of the groups especially reactive is the trimethylbenzyl ammonium halide group.

While the copolymer resin containing a quaternary ammonium anion-exchange group is in a swollen condition in which the chemical groups within the structure are at their maximum availability (although the dry resin in the absence of the swelling agent may also be utilized), an unsaturated, polymerizable aliphatic or aromatic acid or a hydrolyzable ester of such acid is polymerized in situ within the porous structure of the anion-exchange resin intermediate, to thereby introduce into the structure of the resin cation-reactive groups or radicals convertible to the free cation-reactive carboxylic acid radicals. Acid monomers for this purpose include, for example, certain unsaturated acids such as acrylic acid and maleic acid; alternatively, the methyl esters of these acids which may be subsequently hydrolyzed to free their carboxyl groups while trapped in the copolymer structure may also be utilized as the source of the cation-reactive radicals.

A wide variety of solid particles are utilizable in the present process, not only as heat exachange, sorbent and adsorbent media but also as ion-retention particles. Thus, for certain adsorption processes, for example, for the recovery of normal hydrocarbons from branched chain and/or cyclic hydrocarbons (as well as other classes of organic compounds) the solid particles may be the zeolitic metal aluminosilicates (referred to in the art as "molecular sieves"), or the solid particles may consist of porous surface adsorbents, such as activated charcoal, silica or alumina particles when the object of the process is the recovery, for example, of polar compounds such as phenols, alcohols, sulfur compounds, etc., or aromatic hydrocarbons from non-polar substances, such as paraffin hydrocarbons. Other ion-retention particles include polymer structures containing strongly acidic radicals such as the sulfo radical ($—SO_3M$, where M is hydrogen or a metal) and/or other types of basic radicals, such as the polyalkylene polyamines, etc. Certain porous inorganic structures such as the acidic silicates into which compounds containing strong anion-retentive groups are polymerized are also useful herein as ion-retention particles.

Inorganic ion-retention particles are particularly desirable in the present desalinization embodiment of this invention, because inorganic materials are generally more temperature stable than organic materials and, as indicated above, the greater the temperature differential between the ion-retention stage and the ion-desorption stage of the process the greater its Carnot efficiency. Aluminum salts such as aluminum chloride, aluminum sulfate, etc., when hydrolzed under controlled conditions yield inorganic aluminum oxyhalides, oxysulfates, etc., containing hydroxyl groups which have cation-retentive capacity. These temperature-stable ion-exchange materials (which may contain varying proportions of hydroxyl, oxyhalo and alumino radicals) may be mixed with or stratified in alternating layers in one or more beds of the contacting column with particles of a temperature-stable anion-exchange material, such as a zeolite or a sulfonated hydrocarbon polymer, represented, for example by the sulfonated styrene-divinylbenzene copolymers. These mixtures of cationic-anionic ion-exchange materials are stable at temperatures exceeding 250° C. and may be utilized effectively in a water desalinization process, especially a process operated at a high ion-desorption temperature and at superatmospheric pressures.

This invention is not limited in the scope of its application to any specific process or class of processes, such as desalinization, adsorption, xylene isomer or olefin separation or even to separation processes generally; rather, the basic mechanism involved in all the processes to which the present flow arrangement applies (i.e., the introduction of alternating influent and effluent fluid streams charged into a fixed bed of solid particles through which a continuous, cyclic fluid stream flows in simulated countercurrent, moving bed flow relationship to the solid phase) to any continuous flow process involving temperature swings between one or more stages of the cycle. Included within the scope of the basic flow and heat exchange pattern, therefore is a process involving an alternating sorption-desorption cycle in which the non-sorbed component (referred to as "raffinate") is partially refluxed into the secondary rectification zone after being heated to a desorption temperature level. The resulting continuous stream flowing as the effluent from the secondary rectification zone into the next downstream inlet of the desorption zone pushes ahead of it desorbed sorbate phase heated to the desorption temperature. Since the flow rate of secondary reflux is less than balanced reflux, the raffinate component comprising secondary reflux never flows out of the desorbate outlet. Utilizing this system, the introduction of an external source of desorbent is eliminated, while maintaining the purities of the product streams at high levels. The foregoing desalinization process is a specialized application of the latter process flow in which solid ion-retention particles are utilized as the solid heat exchange medium. These particles retain the ions from the feed stock at a low temperature and undergo desorption and regeneration in the presence of a fluid recipient of the ions (deionized water product) which first enters the secondary rectification zone and thereafter continuously flows into the desorption zone at a higher temperature acquired by heat exchange with the solid ion-retention particles.

This invention is further illustrated with respect to several of its specific embodiments in the examples which follow. In thus presenting specific examples of the application of the principles involved in the broad concept of heat exchange to several processes adaptable thereto, it is not thereby intended to limit the scope of the invention necessarily to the specific processes described.

EXAMPLE I

Utilizing the process flow of this invention and a flat-plate rotary valve of the type shown on the accompanying FIGURE 2 for centrally distributing the various feed streams and withdrawing the various product streams from the process, one product consisting of substantially pure water (less than 0.05 percent dissolved solids) and a by-product of concentrated brine (about 9 percent by weight of dissolved solids), utilizing sea water as primary feed stock, is described hereinbelow. The apparatus includes a desalinization unit comprising a group of twenty, serially interconnected beds stacked in a vertical column, illustrated in FIGURE 2 hereof, as column 101 containing beds B1 to B20, coupled with fluid distribution center 102. Each bed is connected to its adjacent bed by a short downcomer conduit extending from the bed above and the downcomer from each bed contains a side-arm nipple connected to a pipe which, together with the pipes from all of the beds in the column connect with inlet and outlet ports arranged around the circumference of a circular valve made up of two flat plates having channels or grooves cut in the surfaces of the flat plates whereby the various influent and effluent streams are directed into the connecting pipes to the appropriate bed in the column. One of the plates rotates as the other plate remains stationary, in fluid-sealed relationship thereto. The channels cut into the engaging face of the lower plate, are spaced to provide a prearranged program of shifting the points of inlet and outlet for the several fluid streams charged into and withdrawn from the process.

As hereinabove described, the process is made especially economical and attractive as a method of producing low-cost deionized water by recovering the heat contained in the hot brine desorbate stream of the process in the heat recovery zone of the process flow, illustrated at one stage of the cyclic process flow (i.e., at the stage of the cycle in which feed stock enters bed B4 of column 101) in FIGURE 2 hereof. Column 101 and fluid distribution center 102 in FIGURE 2 are the full equivalent of units 1 and 2 in FIGURE 1, the vertically stacked arrangement of beds in FIGURE 2 and the flat-plate type valve also shown in FIGURE 2, being the probable actual arrangement of apparatus, for example, for a commercial or industrial adaptation of the corresponding figuratively illustrated units in FIGURE 1.

A conduit 103 containing a liquid pump 104 also connects the top of the uppermost bed in column 101 with the bottom of the lowermost bed in the column, through line 105 between the outlet of the pump and the inlet of bed B20. Each bed of column 101 is packed with resin particles having both cation and anion-retention properties formed by copolymerizing a mixture of styrene and divinylbenzene containing 8 percent by weight of divinylbenzene, utilizing emulsion polymerization as the technique by which spherical particles of a size range of from about 10 mesh to about 60 mesh are produced. The batches of resin are screened to separate particles of a size range of from 20 to about 30 mesh, comprising about 85 percent of the total product. After drying, these particles are converted to their chloromethylated derivatives containing approximately 0.85 chloromethyl groups per aromatic nucleus in the structure of the styrene-divinylbenzene copolymers. For purposes of chloromethylation, the particles are mixed with two volumes of benzene, allowed to soak for three hours, then with two volumes of methyl chloride containing dissolved aluminum chloride (anhydrous, 3 grams per 30 grams of dried styrene-divinylbenzene copolymer). The mixture is thereafter placed in a pressure autoclave and heated to a temperature of 90° C. for three hours, as the autoclave is rotated. Thereafter, the contents are cooled to —10° C. and the liquid drained from the product. The resulting chloromethylated derivatives are then washed with fresh benzene to remove aluminum chloride and while in their expanded state, are thereafter converted to their quaternary ammonium chloride derivatives by reacting the chloromethylated intermediate with dimethylphenylamine which produces a copolymer resin containing trimethylbenzyl ammonium chloride radicals as anion-exchange groups. This conversion is effected by adding one mole of dimethylphenylamine (dissolved in two volumes of benzene) per mole of copolymer to the chloromethylated copolymer and heating the mixture in a pressure autoclave to 110° C. for three hours. After washing with fresh benzene and drying, the product is a low-density, porous material having anion-exchange properties.

The resulting porous resinous product containing quaternary ammonium chloride groups, is thereafter mixed with methacrylic acid in an amount corresponding to one mole of methacrylic acid per aromatic nucleus in the structure of the copolymer resin, thereby providing a slight excess of carboxyl groups relative to quaternary ammonium groups in the resulting product. The resin particles containing absorbed methacrylic acid are thereafter heated in a closed container under a blanket of nitrogen at 100 pounds per square inch gauge pressure to a temperature of 90° C., sufficient to effect substantially complete polymerization of the methacrylic acid absorbed into the porous structure of the copolymer resin intermediate. The resulting, spherically-shaped resinous particles contain trimethylbenzyl ammonium chloride anion-exchange groups and carboxyl cation-exchange radicals, both of which, acting together in an aqueous saline solution, such as sea water containing predominantly sodium chloride as the soluble salt, are capable of completely removing the entire solute content from the aqueous solution, leaving pure water as the fluid residue.

As described above, each of the conduits interconnecting the serially arranged vertical beds (i.e., downcomers) is in turn connected to a pipe which leads to a port in valve 102.

Sea water containing 3.3 percent by weight of dissolved salts (33,000 p.p.m.) made up of 18,980 p.p.m. of chloride ion, 10,561 p.p.m. of sodium ion, 1,272 p.p.m. of magnesium, 884 p.p.m. of sulfur as sulfate, 400 p.p.m. of calcium, 380 p.p.m. of potassium, 65 p.p.m. of bromide, and smaller amounts of 43 other elements, is supplied as feed stock through line 106 leading into fluid distributing center 102 from storage. After aeration, followed by filtration through a bed of charcoal to remove odors and suspended solids, the sea water at 70° F. is pumped from storage at 55 pounds per square inch pressure and at a rate determined by valve 107 in line 106 of $10,970 \times 10^3$ lbs./hr. (21,900 gallons per minute) into the internal channels of valve 102, which direct the sea water into line 108, connecting with the inlet at the bottom of bed B4, the first of four beds: B4 to B1 comprising the ion-retention zone of the process flow at the particular stage of the cycle illustrated in FIGURE 2. Each of the twenty beds in column 101 contains 68,500 lbs. of the above-indicated ion-retention resin having a density of 50.5 lbs./ft.$^3$, or a bulk volume of 1,356 cubic feet. The resin particles are porous, containing 30 percent by volume of internal void spaces and when wet, contain 40 percent by volume of associated water. The resin particles have a specific heat (salt-free) of 0.67.

The quantity of resin contained in the series of four beds: B4 through B1, regenerated in a prior stage of the cycle of operation, is sufficient to substantially completely remove the ionic salt components from the aqueous stream, leaving deionized water which continues its downstream flow successively through beds B3, B2 and B1, into pump-around line 103.

As fresh sea water charge stock flows into bed B4 of the ion-retention zone, deionized water product at a temperature of 77° F. is continuously pumped from line 103, through pump 104, into process recycle line 105 which connects with the bottom of bed B20. The stream of deionized water flowing through line 105 divides into two portions, as determined by the rate of flow into the fluid distribution unit 102: a net primary product portion is withdrawn through line 109 interconnecting line 105 with the fluid distributing center 102 and a second portion, herein referred to as secondary reflux, comprising the non-withdrawn portion continues its downstream flow through line 105 into bed B20. Fluid distribution center 102 contains an internal arrangement of channels and ports which direct the stream of deionized water product into effluent line 110, the rate of withdrawal from the process flow being controlled by valve 111 in line 110. At the operating conditions specified above, the portion of deionized water withdrawn as primary product of the process through line 110 is 13,900 gallons/minute (6,941,000 lbs./hr.) at 77° F. and contains 0.05 percent dissolved solids. Approximately $48 \times 10^6$ B.t.u./hr. of heat (by virtue of the exothermic heat of reaction) are lost from the process by removal of the deionized water product at 7° F. above the sea water inlet temperature.

The portion of deionized water which continues to flow downstream into bed B20 as secondary reflux enters bed B20 at the rate of 3,670,000 lbs./hr. Beds B20 and B19 constitute a heat transfer zone in which the sensible heat imparted to the resin particles by the hot desorbent stream in the immediate downstream desorption or resin regeneration zone is recovered therefrom and transferred to a stream of cool secondary reflux (deionized water) effluent from bed B1 of the ion-retention zone. The countercurrent flow of the cool secondary reflux relative to the hot resin particles also cools the resin to 77° F., substantially the feed inlet temperature, in preparation of the re-entry of regenerated resin into the cool ion-retention zone of the process flow. Contrary to the rise in temperature of the fluid stream as it flows in a downstream direction, the temperature of the solid phase (resin) decreases as it moves in an upstream direction under simulated moving bed conditions, away from the resin regeneration zone toward the ion-retention zone. At the stage of the cycle, illustrated in FIGURE 2, the temperature of the resin at the secondary reflux inlet of the secondary rectification zone (fluid inlet to bed B20) is 79° F. and at the downstream outlet of bed B20 (fluid inlet of B19), the temperature of the fluid stream is 110° F., countercurrent heat exchange of the relatively cool secondary reflux with the hot resin particles accounting for the increase in the temperature of the reflux stream. Further heat exchange of the secondary reflux with the hot resin in downstream bed B19 raises the temperature of the effluent stream from bed B19 to 175° F., the resin particles undergoing a corresponding decrease in temperature of nearly 100° F. from the inlet of bed B19 to the outlet of bed B20.

The stream flowing out of bed B19 at 175° F. through the conduit connecting the bottom of bed B18 with the top of bed B19, is withdrawn from the interconecting conduit into line 112 and by means of the internal channels in valve 102, the stream flows from line 112 into valve 102, out of the valve into line 113, through heater 114 by means of pump 115 into line 116 which returns the hot secondary reflux stream to valve 102, thereafter flowing from the valve through line 117 into bed B17. Heater 114 raises the temperature of the aqueous stream from about 175° F. at the outlet of bed B19 to about 214° F. at the inlet of bed B17, the latter temperature being approximately the maximum tolerable limit for the particular resin utilized in the present process. Heater 114 is operated with steam at 350° F., adding $105 \times 10^6$ B.t.u./hr. to the secondary reflux stream charged into bed B17.

As the stream of secondary reflux flows through bed B17 and the superadjacent downstream beds: B16, B15, B14, B13 and B12, the work required in the endothermic reaction of desorbing ionic constituents (principally NaCl) from the resin reduces the temperature of the desorbent, at the same time that the concentration of ions in this stream increases. The temperature of the regenerant solution flowing out of downstream bed B15 into the interconnecting conduit between beds B15 and B14 has been reduced to 175° F. and has released the $105 \times 10^6$ B.t.u./hr. added as heat in heater 114. Analysis of the solute content of fluid stream leaving bed B14 by withdrawing a sample of the fluid from bed B14 and evaporation of the liquid to dryness indicates that the content of dissolved solids in the brine leaving bed B14 has increased to approximately 9 percent by weight.

The stream of liquid desorbent leaving the interconnecting conduit between beds B15 and B14 at 175° F. is withdrawn from column 101 through line 118 into fluid distributing valve 102, which directs the effluent stream into external line 119, through heater 120 and by means of pump 121, the heated stream is returned at 15 lbs./in.$^2$ to valve 102 through line 122. Heater 120 raises the temperature of the desorbent stream to 220° F., adding $130 \times 10^6$ B.t.u./hr. to the regenerant. Valve 102 directs the incoming stream, through internal channels within the valve, into line 123 connected to the conduit between beds B14 and B13, the hot regenerant thereafter flowing through successive downstream beds: B12, B11, and B10 to regenerate further the resin in bed B12 and to recover sensible heat from the desorbent stream in bed B11 and B10. A sample of the desorbent stream withdrawn from the outlet of bed B11 indicates that the salt content of the desorbent stream has increased to 13.5 percent by weight of solids and the temperature of the stream has dropped to 164° F.

In receiving the hot desorbent stream beds B11 and B10 make up a heat reception zone wherein a portion of the heat carried by the desorbate is recovered by heat exchange with cool resin, although the salt content of the resin increases as its temperature is progressively reduced. The desorbate stream leaving bed B10 is divided into two parts, one portion, referred to as "primary reflux" is permitted to continue to flow downstream at a controlled rate designated as the primary reflux flow rate into bed B9, and the remainder is withdrawn from the process flow as desorbate by-product. The latter is a concentrated brine having a temperature of 120° F., containing 9% by weight of dissolved solids; this stream is diverted through the ports and internal channels of rotary valve 102, through line 124 into brine by-product line 125 at a rate of flow, determined by valve 126, of $4.029 \times 10^6$ lbs./hr., comprising one of the important process control variables, because of its effect on the primary reflux flow rate. At 120° F., (50° F. above the datum primary feed stock inlet temperature of 70° F.), this stream removes approximately $187 \times 10^6$ B.t.u./hr. from the process.

The portion of the brine desorbate stream which continues to flow downstream from bed B9 into bed B8, herein designated as "primary reflux," is controlled to flow at a rate of 110 percent of the aggregate volume of void space (i.e., the volume of interstitial fluid) between the particles of resin in bed B9 (which is the same void space volume in each of the other beds of column 101). At this rate of flow, the primary reflux front advancing downstream sweeps the interstitial fluid (charge stock) remaining in the void spaces in bed B9 when this bed was part of the ion-retention zone, replacing the fluid with concentrated brine which will be withdrawn from bed B9 after the next shift in inlets and outlets of column 101. Because of the tendency for the concentrated brine desorbate to mix somewhat with interstitial fluid beyond the front advancing downstream through the beds as a result of turbulence at the interface, the primary reflux flow is preferably maintained at a rate slightly greater than balanced reflux. The present flow rate of 5,800 gals./minute represents 110 percent of balanced reflux. This rate of primary reflux flow preheats the resin from the 70° F. datum temperature of the primary feed stock (at which temperature the resin last previously contacted fresh sea water charge stock in the ion-retention zone of the process) to a temperature of 120° F. as the bed enters the last downstream position of the desorption or resin regeneration zone.

After 45 seconds on stream in the above beds, valve 102 changes the position of the inlet and outlet points of entry and exit of the above influent and effluent streams so that primary feed stock now enters bed B3, deionized water product flows out of bed B20, secondary reflux flows from bed B19 into B18, brine flows out of bed B9, and primary reflux flows from the outlet of bed B8 into the inlet of bed B7.

The heat recovered from the hot desorbate stream by heat exchange of the desorbate with the cold resin advancing upstream from the primary rectification zone at an initial temperature of about 70° F. through the heat reception zone to a temperature of about 175° F. and the heat transferred from the hot resin leaving the desorption-regeneration zone by heat exchange with the cool secondary reflux (entering the secondary rectification zone at about 77° F.) are substantially balanced (except for heat losses occurring as radiation, the heat loss from the system as hot brine desorbate (at 120° F.) and the loss of heat in the deionized water product). This balance of heat is realized when the simulated resin circulation rate is sufficient to complete a cycle of operation every 15 minutes. Thus, the aggregate volume of resin ($1.37 \times 10^6$ lbs.) is heated from 70° F. sea water inlet temperature to 175° F. (resin desorption outlet temperature) in each cycle of 15 minutes, while simultaneously in the same period of each cycle 1,735,250 lbs. of water are withdrawn at 77° F. from the process flow and 917,500 lbs. of water during the cycle period are pumped into the secondary rectification zone and heated from 77° F. to 175° F. and thereafter cooled again to 120° F. by heat exchange with cool resin entering the primary rectification zone. An approximate heat balance of the system indicates that $187 \times 10^6$ B.t.u./hr. of the heat introduced into the cycle (that is, as heat added to the process stream above the 70° F. feed stock inlet temperature) is lost in the brine product effluent at 120° F. and $48 \times 10^6$ B.t.u./hr. is lost from the system as exothermic desalinization heat of deionization in raising the temperature of the deionized water product from 70° F. sea water inlet temperature to 77° F. primary product outlet temperature or a net heat consumption or loss from the system of $235 \times 10^6$ B.t.u./hr. in the fluid products. A heat balance on the solid (resin) and liquid (water) phases, based on the equation:

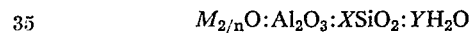

confirms that a cycle period of 15 minutes for the simulated solid resin is optimum for this system and reduces the heat loss to a minimum.

EXAMPLE II

In the following run, a mixture of propane-propylene, one of the common petroleum refinery waste gases, is separated into its components: (1) an adsorbate product consisting of 98.9 percent propylene, and (2) a raffinate product consisting of 99.5 percent propane. This normally gaseous mixture, the components of which boil at from —42 to —47° C. is difficult to separate into relatively pure fractions by liquefaction, followed by distillation because the boiling points of the components are in such close proximity, and yet substantially pure propylene is generally required in processes utilizing propylene, such as polymerization processes to produce solid isotactic polymers characterized as the polypropylene plastics. Utilizing the process of this invention, a propane-propylene mixture is separated by contacting the mixture in liquid phase with a solid sorbent of the molecular sieve type, such as a dehydrated, zeolitic metal aluminosilicate, represented by the formula:

$$M_{2/n}O:Al_2O_3:XSiO_2:YH_2O$$

in which M is an alkaline earth and/or alkali metal (e.g., calcium and/or sodium), $n$ is the valence of the metal M, X has a value of $1.85 \pm 0.5$ and Y is a number from 0 to 6. These crystalline zeolites are prepared by crystallization from aqueous solutions of sodium aluminate (or other sources of alumina sol) and sodium metasilicate at temperatures in the region of the boiling point of water, followed by filtering the crystalline, hydrated sodium salt precipitated during the course of the reaction and base exchanging the sodium salt with an aqueous solution of an alkaline earth metal salt, such as calcium chloride. Replacement of a major proportion of the sodium ion from the salt with, e.g., calcium, increases the pore openings in the crystalline zeolite from about 4 to about 5 Angstrom units. The product prepared in this manner is in the form of extremely fine crystals, but by compositing the crystals with a suitable porous clay and pelletizing or extruding the mixture into pellets, followed by dehydration of the zeolitic crystals at 350° to 450° C., sorbent particles having a size usable in a separation process are produced. The pore openings in the zeolitic crystals selectively retain propylene from a $C_3$ propane-propylene mixture contacted with the particles. These pellets, however, are fragile and cannot be utilized in a moving bed system under conditions of attrition because the particles rapidly pulverize. The present process which provides a continuously cyclic, simulated moving bed process by moving the points of inlet and outlet for the various influent and effluent streams into and from a series of interconnected fixed beds containing the sorbent, similar to the system shown in FIGURES 1 and 2 hereof, presents an effective method of utilizing this class of separating agent for the separation and recovery of propylene from propane.

Following sorption of the propylene in the fixed beds of sorbent and withdrawal of the substantially non-sorbed propane from the beds of sorbent downstream from the sorption zone, the propylene sorbate is desorbed from the spent sorbent (which thereupon becomes regenerated) by contacting the spent sorbent with a stream of n-butane supplied from an external source at an elevated temperature.

A liquefied gas mixture consisting of propylene (62 percent by weight), propane (36.1 percent by weight) and minor proportions of ethane, methane and ethylene is charged at 50° F. and at 280 lbs./in.² pressure into the feed stock inlet of a rotary valve fluid distribution center, similar to the apparatus shown in Example I, above, except that the separation column contains 15 beds. Each bed is connected by a line to the fluid distribution center and each bed contains an equal volume of Linde Co. 5A molecular sieve particles in the form of cylindrical pellets $\frac{1}{16}$" x $\frac{1}{16}$", containing dehydrated crystals of calcium aluminosilicate having pores of about 5 Angstrom units cross-sectional diameter. At the particular stage of the process cycle herein described, which represents an analysis of the functioning stages in the process cycle at a given point of time in which the feed stock inlet is bed No. 1 at the top of the column, the sorption zone of process cycle includes beds Nos. 1 to 3 of the series of 15 beds. The beds are numbered from 1 at the top of the column to 15 at the bottom, the flow of fluid being downward through the column.

The propylene component of the mixture is rapidly sorbed into the pores of the molecular sieve particles, leaving a non-sorbed raffinate residue which is withdrawn as raffinate product from the outlet of bed No. 3, the downstream outlet of the sorption zone. The portion of the raffinate stream comprising secondary reflux, flows past the raffinate product outlet of bed No. 3 into the fourth downstream bed which is the first of two beds comprising the secondary rectification zone.

Approximately 59 percent of the total volume of each bed in the separation column comprises void space volume (i.e., the volume between particles of sorbent and between the walls of the column and the sorbent particles occupied by interstitial fluid). The rate of secondary reflux (propane) flowing into the secondary rectification zone is set by the withdrawal rate of raffinate (propane) from the process flow to be somewhat less than the volume of void space in the first bed of the secondary rectification zone (i.e., less than the interstitial fluid in bed No. 4) preferably, from 80 to 95 percent of said void space volume. The rate of secondary reflux flow is maintained at less than valanced reflux to preclude propane raffinate (secondary reflux) from entering the downstream desorption zone where it would join the large influx of desorbent and flow out of the desorption zone with the desorbate product. In the instant run, the rate of secondary reflux flow is fixed at 95 percent of balanced reflux (sufficient to provide a volume of secondary reflux before the next shift in the secondary reflux inlet equal to 95 percent of the total aggregate void volume in bed No. 4) and the latter bed is therefore said to be "under-refluxed" by approximately 5 percent of balanced reflux. The flow of propane into the first bed of the secondary rectification zone, consisting of beds Nos. 4 and 5, also prepares this bed for the subsequent shift in inlets and outlets to the next downstream beds when raffinate will next be withdrawn from the current first bed of the secondary rectification zone. As propane reflux at 50° F. flows into the first bed of the secondary rectification zone, it meets hot particles of sorbent which were heated when this bed was one of the series of beds comprising the desorption zone in a prior stage of the current cycle. The flow of cool propane reflux into this bed also cools the particles of sorbent by heat exchange with the propane stream to approximately the temperature at which the sorption zone (at 50° F.) is operated and prepares this bed for its use as the propane raffinate outlet after the next shift of inlet and outlet points.

At the same instant that feed mixture is charged into the inlet of the sorption zone (bed No. 1) and propane raffinate is withdrawn from the outlet of the third downstream bed of the sorption zone, a stream of n-butane desorbent at 280 lbs./in.² and at 80° F. is charged into the heat exchange inlet end of the desorption zone comprising eight beds in series beginning with the sixth downstream bed from the inlet of the sorption zone (bed No. 1). The n-butane is charged into the desorption zone at a rate corresponding to 20 volumes of n-butane per sorbate volume which is equal to the sorbate (propylene) capacity of the molecular sieves in each bed of the series. The sorbate capacity of the present 5A molecular sieves is uniformly about 12 percent of the gross particle volume, representing the aggregate total pore volume (liquid) in each molecular sieve particle. The present desorbent flow rate (20 volumes per volume of sorbate) provides a sufficient molar excess of desorbent in the interstitial fluid surrounding each of the sorbent particles to effect the desorption of propylene based on the Mass Action effect, which together with the effect of the elevated desorbent temperature, displaces the propylene retained within the pores of the molecular sieve particles when the bed was part of the sorption zone in a prior stage of the cycle. The Mass Action effect or driving force of desorption increases as the beds in the desorption zone advance under countercurrent, simulated moving bed flow conditions toward the inlet of the desorption zone, since the molar ratio of n-butane to propylene in the perfluent desorbent stream increases in this direction.

The incoming fresh desorbent stream heated externally to 80° F. and at 280 lbs./in.² heat exchanges with the relatively cool sorbent particles advancing upstream and heats the solid phase to a temperature varying from 80° F. in bed 6 to 50° F. in bed No. 13. The desorbent stream is withdrawn from the outlet bed No. 10 in the desorption zone at 61° F. and heated in an external heater to a temperature of 80° F., and then reintroduced into the inlet of bed No. 12 to complete the desorption in the next series of two beds (i.e., beds Nos. 12 to 13, inclusive) of the desorption zone. A resulting liquid mixture of n-butane desorbent and propylene desorbate flows through the downstream beds, undergoing heat exchange with the cool particles of sorbent flowing upstream under simulated, countercurrent moving bed conditions. These particles leave the upstream end of the secondary rectification zone (into which cool secondary reflux enters) at 52° F., approximately the feed stock inlet temperature, and therefore have released substantially all of the sensible heat stored in the particles to the desorbent stream and have simultaneously cooled the particles prior to their entry into the sorption zone of the process flow where a low temperature is required.

The desorbate stream reaching the outlet of bed No. 13 is in part withdrawn from the process at a temperature of 72° F. into a distillation column to separate propylene (overhead fraction consisting of 98.9 percent propylene) from n-butane bottoms which is recycled directly to the desorption zone, the remainder of the desorbate effluent flowing into downstream bed No. 14 as primary reflux. The rate of primary reflux is fixed to over-reflux the first bed (No. 14) of the primary rectification zone to the extent of 120 percent of balanced reflux or 120 percent of the volume of interstitial fluid in the void spaces between the particles of sorbent in bed No. 14 during the period of time that bed 14 is on stream as the first bed of the primary rectification zone.

The effluent stream of the primary rectification zone comprising feed stock displaced from the void spaces between the particles of sorbent and left there when bed Nos. 14 and 15 comprised the sorption zone during a preceding stage of the process cycle flows downstream, first through bed 14, then into bed 15. The fluid phase in bed 15 at a pressure of 280 lbs./in.² is, in turn, displaced by fluid from bed 14 coming into bed 15. The interstitial fluid in bed 15 flows out of the bottom of bed 15 into a line which is connected to an external pump which increases the ambient pressure to 290 lbs./in.² and is then pumped to the top bed of the separation column as the pump-around stream entering bed No. 1.

The rate of primary reflux flow into bed 14 of the primary rectification zone (120 percent of the interstitial fluid phase in bed 14) is sufficient to completely displace the residual fluid (feed mixture) occupying the void spaces between the particles of sorbent in bed 14 before the next downstream shift of inlets and outlets, thereby not only preheating bed 14 to become the last bed of the desorption zone after the next shift in inlets and outlets, but also displacing the residual feed mixture into the downstream beds which in turn continuously displaces feed stock from the void spaces in the last bed of the primary rectification zone into bed No. 1, currently receiving feed stock as the first bed of the sorption zone.

The high degree of heat exchange between the fluid streams and sorbent particles enables the process to be operated continuously with only the heat required to heat the desorbent stream to 80° F. being consumed in the process, since the primary reflux portion of the desorbate stream preheats the particles of cool sorbent to nearly the desorption temperature, and simultaneously cools the interstitial fluid displaced by primary reflux prior to entry displaced fluid into the sorption zone. In addition, cool, influent secondary reflux is heated by heat exchange with hot sorbent particles flowing upstream out of the desorption zone to substantially the desorption temperature and cools the sorbent particles entering the sorption zone. The rapid and substantially complete exchange of heat between the liquid and solid phases is feasible only by virtue of the large surface area available to the continuously cyclic fluid stream in contact with the porous solid particles of sorbent.

Since all of the beds are interconnected from the first to the last and from the last to the first bed in the series, the flow of liquid through the column is continuous (that is, uninterrupted), although the line of demarcation between displaced liquid and the front of oncoming liquid is maintained sharp and well-defined because of the intervening rectifying beds of solid between influent feed streams and effluent product streams.

Feed stock continues to flow into bed No. 1 and desorbent into bed No. 6 for a period of 2.5 minutes. During this period in which bed No. 1 is on-stream to receive feed stock, the rotary valve of the fluid distribution center rotates $\frac{1}{15}$ of its circumference and at the end of 2.5 minutes all of the feed inlets and product outlets have shifted to the inlets and outlets, respectively of the next adjacent downstream beds; that is, feed stock then enters bed No. 2 while bed No. 1 has been shifted upstream into the primary rectification zone; desorbent enters bed No. 7; raffinate is withdrawn from bed No. 4 and sorbate from bed No. 14. After each 2.5 minute interval, the inlet and outlet points have again shifted to the next downstream beds, one cycle of operation being completed after 37.5 minutes, at which point, feed stock again enters bed No. 1 to commence another cycle of operation.

A variety of other olefin-paraffin mixtures, from $C_3$ to $C_{20}$ in chain length, and particularly mixtures which are difficult to separate by other means because of the close proximity of their boiling points, and aromatic-paraffin mixtures are also utilized as feed stocks. The process is also applicable to a variety of sorbents and adsorbents as the solid particle phase. Thus, a mixture of benzene or other higher boiling aromatic hydrocarbon and a closely boiling paraffin was separated in a process of separation similar to the above, utilizing an activated adsorbent (silica gel spheres in one run and activated coal charcoal in another run) as the solid contacting agent-heat exchange medium. Equivalent results are also obtained utilizing activated charcoal particles which have a selective adsorptivity for aromatics as well as for various polar substances, such as mercaptans, amines, phenols, etc. Still another system of separation utilizing the principle of operation, herein provided, is a solvent extraction process employing porous solid particles suffused with a solvent for one of the components to be separated. Thus, benzene, toluene and xylene are recovered from a reformed gasoline fraction (in which the aromatics are mixed with paraffins) when the gasoline boiling range fraction is contacted with a series of absorbent beds comprising a highly porous wood charcoal (screened to particles sizes of from 20–30 mesh) containing triethylene glycol in the porous structure of the charcoal. The extraction effected by contacting the feed stream with the glycol impregnated charcoal is obtained at a temperature of 220° F. and at a pressure of 90 lbs./in.$^2$. The raffinate removed from the downstream end of the absorption zone contains less than 0.5 percent of aromatics. The selectivity extracted aromatics are desorbed from the "rich" absorbent in a separate stripping zone of the cyclic series of beds by contacting the solvent-containing absorbent particles (i.e., rich absorbent) with a cooled portion of the raffinate refluxed into the beds downstream from the raffinate withdrawal line. The raffinate is partly cooled by internal heat exchange with the beds of particles in the downstream desorption zone and partly by external heat exchange. By such heat exchange the desorbate is ultimately reduced in temperature to 70° F. at the outlet of the stripping zone downstream from the extraction zone. The lighter aromatics being recovered from the kerosene-aromatic desorbate effluent by fractional distillation.

EXAMPLE III

In the following run, a small-scale model of the twenty-bed, continuous-flow apparatus, including a scaled-down model of the rotary valve, illustrated in Example I, and modified to provide a means for separating a hydrocarbon feed stock, is provided as the separation unit for recovering the aromatic components of a mixed hydrocarbon feed stock utilizing an activated adsorbent selective for aromatic hydrocarbons (as distinguished from paraffinic hydrocarbons which make up the raffinate product) as the solid phase in each bed of the column. The process is also modified from the flow described in Example I by the character of the desorption occurring in the two processes. In the desalinization process described in Example I, the salt ions held by the ion-retention resin are desorbed as a result of raising the temperature of the resin whereby the capacity of the resin to retain the salt ions is reduced, although the selectivity of the resin for water is also involved in the desorption mechanism. The net effect of increasing the temperature of the resin in the presence of water, however, is the desorption of ions from the resin. In the present run, the adsorptivity of silica gel for the aromatic adsorbate component is altered by changing the selectivity of the adsorbent accompanying a change in the temperature of the adsorbent. The latter, in effect, becomes less selective for the aromatic hydrocarbon component of the feed stock at the desorption temperature and more selective for the paraffinic and other normally raffinate components of the feed stock.

The solid adsorbent particles are $\frac{1}{16}$-inch silica gel spheres, prepared by suspending silica sol in a state of incipient gel formation (water glass acidified to a pH of about 6.8) in an oil bath at 90° C., followed by dehydrating the recovered silica gel spheres at 250° C. to develop a low density, porous structure and calcination of the dried particles at 500° C. to develop maximum porosity and adsorptiveness. After activation at 500° C., the resulting activated silica gel particles are submersed in sufficient dry cyclohexane to cover the particles and thereby prevent deactivation of the sorbent by sorption of atmospheric moisture while loading the particles into the separation column, each of the 20 beds containing 0.5 ft.$^3$ of silica gel spheres. The gel particles have an average adsorbate volume (volume of benzene sorbed/volume of spheres) of 10 percent and the void volume between particles of adsorbent in each bed (i.e., the volume of interstitial fluid) is approximately 55 percent of the gross volume of the spheres.

The feed stock is a naphtha fraction of a reformed gasoline product containing 35 percent by weight of benzene, 8 percent by weight of methylcyclopentane, 12 percent by weight of cyclohexane, 21 percent by weight of normal hexane and 24 percent by weight of various $C_6$ branched chain paraffins, such as dimethylbutane, 3-methylpentene, etc.

At the particular stage of the process cycle which represents a point of time in the process flow, the feed stock represented by the above naphtha fraction is charged into the inlet of bed No. 5 at a rate of 30.9 gals./hr., at a temperature of 30° C. and at a pressure of 300 p.s.i.g. The feed stock flows upwardly through the fixed beds of solid particles, joining a liquid hydrocarbon stream which flows past the inlet of bed No. 5. This stream contacts regenerated sorbent which in effect, flows as a simulated moving bed, countercurrently downward through the column. The mass of sorbent is maintained as a series of stacked, fixed beds, in an arrangement similar to that shown in FIGURE 2 of Example I.

A pump-around pipe connects the outlet of bed No. 1 at the top of the column to the inlet of bed No. 20 at the bottom of the column and at the stage of the cycle in which feed stock enters bed No. 5, a raffinate product is in part withdrawn through the fluid distribution center from the pump-around line at the rate of 20.1 gals./hr., and the remainder flows downstream into bed 20 as secondary reflux (which also serves as the source of internal desorbent) in the downstream desorption zone. The raffinate product is composed of 18.2 perecnt cyclohexane, 31.6 percent normal hexane, 12.1 percent methylcyclopentane, 1.6 percent benzene, 36.2 percent branched chain isohexanes and 0.3 percent normal pentane.

That portion of the pump-around stream, which, at the stage of the process cycle here exemplified (in which feed stock enters bed No. 5) is secondary reflux, is pumped into the inlet of bed No. 20 (the bottom of the column) at the rate of 63.1 gals./hr. representing about 110 percent of balanced reflux. The flow rate of secondary reflux in this run is fixed at 110 percent of balanced reflux because this stream will serve the dual function of secondary reflux and by continuing to flow downstream from the secondary rectification zone (the next adjacent downstream zone) it also serves as the source of desorbent. In order to avoid contamination of the desorbate product with raffinate (which makes up the secondary reflux stream) the volume of influent secondary reflux must not exceed in total a volume equal to the volume of void space plus the adsorbate volume in the next downstream bed. Since the void space volume is approximately 55 percent of gross volume (0.5 ft.$^3$) and adsorbate volume is 10 percent of gross volume, a desorbent rate of 65 percent of the gross volume of each bed will provide a flow rate equal to 110 percent of balanced reflux. Thus, after this stream has served its purpose as secondary reflux where it also recovers a large proportion of the sensible heat stored in the solid adsorbent descending from the desorption zone, it is then heated further to serve as a source of desorbent supply, not only displacing adsorbate from the pores of the adsorbent, but also taking the place of the resident fluid between particles of adsorbent (interstitial fluid), pushing ahead of it the displaced adsorbate. Consequently, only raffinate components which make up the secondary reflux (and which also serves as desorbent) remain as adsorbate on the silica gel at the elevated temperatures in the desorption zone. Thus, as the temperature of the adsorbent changes in its simulated movement from the relatively cool sorption zone into the high temperature desorption zone, its selectivity also changes from high aromatic, low paraffinic selectivity in the sorption zone to high paraffinic, low aromatic selectivity in the desorption zone.

The secondary rectification zone effluent which is the source of desorbent is heated in several stages to the higher temperatures required for desorption. Thus, at the same instant the feed stock enters the inlet of bed No. 5, the stream leaving the secondary rectification zone (bed No. 19) and partially heated to a temperature of 155° C. by heat exchange with solid adsorbent, in effect descending downwardly from the high-temperature desorption zone under simulated moving bed flow conditions, is withdrawn at a flow rate of 65.8 gals./hr. into a heat exchanger of the fin-and-tube type in which the stream is first heat exchanged with high-temperature desorbate effluent from downstream bed No. 8 (from which heat is advantageously recovered before withdrawal as product from the process flow) and then heated further in an auxiliary gas fired heater to the temperature level required in the desorption zone of the process flow. In the first stage of the external heat exchange in which the hot desorbate is heat exchanged with the effluent from bed No. 19, desorbate fluid at 205° C. enters the heat exchange unit at one end at the same time that bed 19 effluent enters at the other end; the resulting heat exchange raises the temperature of bed 19 effluent (desorbent) from 155° to 185° C. In the second stage of the heat exchange in which the effluent of the first stage is further heated in a gas-fired heat exchanger, the temperature of the desorbent is raised further to 220° C. and at this temperature the stream is recharged into the column, entering the inlet of bed No. 17. The heat exchanged desorbate effluent of the first stage heat exchange unit, now cooled to 160° C., is withdrawn from the process flow and further cooled to 30° C. in a water-cooled heat exchange as desorbate product, hereinafter more fully characterized.

The desorbent stream, now at a pressure of 300 lbs./sq. in. and at a temperature of 220° C. flows at a rate of 65.8 gals./hr. representing a desorbent/combined void space and adsorbate space volume ratio of 1/1 (or 110% of balanced reflux) enters bed No. 17 and continues to flow downstream (upwardly) against the descending solid sorbent particles.

As the desorbent flows downstream through the series of beds containing the silica gel adsorbent, and as the raffinate hydrocarbons comprising the desorbent displace the adsorbed benzene from the pores of the adsorbent at the relatively high temperature of the desorbent stream, it meets solid which becomes progressively richer in adsorbed benzene.

The effluent of downstream bed No. 8, is partially removed as desorbate product, representing the net aromatic product of the process. The stream is removed from the process flow at a rate of 10.4 gals./hr. at a purity of 98% which represents a yield of 96.2% by weight of the benzene charged as feed stock.

The effluent stream of bed No. 8 however is not entirely withdrawn as adsorbate product, but a net flow, representing 120% of balanced reflux, at a rate of 53.9 gals./hr., continues to flow as primary reflux into downstream bed No. 7 where the primary reflux fluid undergoes heat exchange with cool silica gel adsorbent particles descending from bed No. 7 in simulated moving bed relationship to the fluid stream. The resulting heat exchange also raises the temperature of the adsorbent particles to 180° C. before the latter descend into the high temperature desorption zone. In addition, the reflux of desorbate into bed No. 7 displaces the fluid previously occupying the void spaces between the particles of sorbent with fluid of the same composition that will be withdrawn from the outlet of bed No. 7 after the next shift of inlets and outlets from the contacting column.

Although the primary reflux undergoes partial heat exchange with the solid adsorbent, the heat exchange is not sufficiently complete in the number of beds which can be practicably supplied in the primary rectification zone to reduce the temperature of the continuous fluid to the feed stock inlet temperature. Accordingly, the fluid stream leaving the last bed of the current desorption zone at a temperature of 150° C. (bed No. 7) is withdrawn from the column into an external heat exchange unit containing coils through which water at atmospheric temperatures is circulated to reduce the temperature of the primary reflux to approximately 30° C. which corresponds to the feed stock inlet temperature. The heat exchanged primary reflux thereafter flows via the fluid distribution center into the feed stock inlet line to bed No. 5. Since the effluent of bed No. 7 is predominantly feed stock which occupied the void spaces between the particles of silica gel as interstitial fluid, before the feed inlet was moved to bed No. 5, and being now cooled to the feed inlet temperature, the interstitial fluid displaced by the primary reflux in upstream from bed No. 7 is bled into the influent feed stock without disturbing the equilibrium conditions maintained in the contacting column.

By virtue of the foregoing simulated moving bed flow relationship between adsorbent and the continuously flowing fluid stream in the contacting column and as a result of heat exchange between the hot primary reflux fluid with cold adsorbent in the primary rectification zone of the process flow and between cold secondary reflux (raffinate entering the secondary rectification zone) with hot adsorbent in the secondary rectification zone, approximately 78% of the heat required for desorption which would otherwise have been lost from the process as hot effluent product streams is recovered through such internal heat exchange.

In the foregoing run a fluid consisting of the raffinate and least adsorbed components of the feed stock mixture was utilized as a source of desorbent to displace preferentially adsorbed benzene from the particles of silica gel adsorbent. This type of operation, contemplated as one embodiment of the present invention, is feasible only because the selectivity of the adsorbent changes with temperature, being more selective for aromatic hydrocarbons than for naphthenic, isoparaffinic and n-paraffinic hydrocarbons at low temperatures, but less selective for aromatic hydrocarbons relative to the foregoing raffinate type hydrocarbons at higher temperatures. Consequently a paraffinic hydrocarbon which makes up the raffinate effluent of the cool adsorption zone of the process flow can also act as desorbent and displace previously adsorbed aromatic components from the adsorbent when heated and contacted with the adsorbent in which the pores are filled with aromatic component. The temperature swing cycle inherent in the process flow of this invention is therefore especially adapted to the foregoing adsorption-desorption mechanism dependent upon a change in the selectivity of the adsorbent with changes in temperature.

EXAMPLE IV

In the following run the apparatus and process described in Example II, above, for the extraction of aromatics from a reformed petroleum stock is utilized in this run which is directed to a process utilizing a porous, solid adsorbent infused with a glycol solvent as the aromatic recovery agent. Besides operating as an extraction unit, the process also acts as a heat exchange unit to recover the heat contained in the raffinate product, whereby a major portion of the heat contained in the effluent of the absorption zone is recovered, transferred to the solid particle phase and recovered therefrom by a primary reflux stream for transfer to cold absorbent prior to the latter entering the absorption zone of the process flow. A n-hexane diluent is intermixed with the feed stock and becomes part of the raffinate effluent from which it is fractionated to serve as a source of desorbent charged into the process at a cool desorption temperature. Although a raffinate type of compound is thus utilized as desorbent, it is in effect, externally supplied and has more advantageous desorptive properties than the feed stock raffinate components.

The apparatus of this run consists of a vertical column containing 20 serially interconnected fixed beds of charcoal particles (10–25 mesh) infused with a solvent comprising a 5 percent aqueous solution of triethylene glycol. The particles which are free of superfluous liquid contain 80 percent by weight of the aqueous glycol. Each bed contains a gross volume of 0.5 ft.$^3$ of particles and 28 percent of the gross volume, or 0.14 ft.$^3$/bed, represents void space volume. A complementary fluid distribution center, in the form of a rotary valve of the type specified in Example I, above, was coupled with the separation column.

The auxiliary heat exchange unit which is operated in a secondary run with the above separation unit to provide a basis of comparison of the economics involved with and without the auxiliary unit is a column of the present flow arrangement designed to receive a feed stream consisiting of hot raffinate effluent from the separation unit. Although a secondary reflux portion of the raffinate is heat exchanged with the cool, solid absorbent in the secondary rectification zone of the process flow, in both processes, a major proportion of the heat contained in the raffinate is withdrawn as raffinate product unless heat exchanged with one of the feed streams, as in the second process hereinafter described. In both processes the solid absorbent containing absorbed aromatics is cooled in the desorption zone and upon cooling, the capacity of the absorbent is reduced, and the bicyclic aromatics absorbed in the triethylene glycol-charcoal particles precipitate out of the glycol solvent held by the absorbent.

The feed stock source of bicyclic aromatics for the separation process is a 210°–250° C. fraction of a hydroformed kerosene fraction, containing the following components by hydrocarbon types:

| | Wt. percent |
|---|---|
| $C_{10}$–$C_{11}$ bicyclic aromatics | 28.5 |
| Paraffins, aliphatic | 68.3 |
| Naphthenes | 3.2 |

This stock is diluted with three volumes of n-hexane per volume of stock which is subsequently fractionated from the raffinate stream and partially recycled into the process as desorbent. The added hexane diluent increases the volume of raffinate and makes the separation more selective.

In the following run the above feed stock mixture is subjected to separation via solvent absorption in contact with the above indicated triethylene glycol-infused charcoal particles, the hot raffinate effluent is withdrawn from the process flow through a heat exchanger which preheats the charge stock and a cool desorbent (hexane) is utilized to cool the aromatic-rich absorbent and thereby precipitate the absorbed aromatics from the solid phase. The feed stock mixture of kerosene and hexane at 70° F. and at 100 lbs./in.$^2$ pressure is heated to a temperature of 250° F. (requiring 2.79×10$^5$ B.t.u./hr.) and thereafter charged at a rate of 129 gals./hr. (517 gals./hr. including hexane diluent) into the inlet of bed No. 1 at the top of a vertical separation column containing 20 fixed beds of the aforementioned solid absorbent, through a fluid distribution center similar to that described in Example I, above, which provides a program of shifting the inlets and outlets into and from the separation column in accordance with a prearranged schedule to provide simulated, counter-current movement of the solid particles relative to the fluid phase. The continuous fluid stream flows downwardly through the column as the fluid inlets and outlets are shifted through the series of beds, from the top to the bottom of the column, thereby providing simulated counter-current movement of the stationary solid absorbent phase relative to the fluid stream which flows downwardly through the series of beds. Since the raffinate contains all of the n-hexane added as a diluent to the feed stock which can be recycled in the process and which, furthermore, is a desirable desorbent in the present process, the raffinate effluent is fractionated to separate an overhead boiling at 158° F. from a residue of feed stock raffinate which is discharged from the process flow. This product (92 gals./hr.) contains less than two percent by weight of aromatic components. The n-hexane overhead (388 gals./hr. is in part recycled to the feed stock inlet and in part used as desorbent).

A portion of the raffinate stream, representing 95% of balanced reflux, or a volume rate of flow of 240 gals./hr. bypasses the raffinate outlet as secondary reflux and flows into the next adjacent downstream bed (bed No. 8), carrying raffinate at 238° F. into the downstream beds advancing upstream from the cool desorption zone. By heat exchange of the displaced interstitial fluid flowing downstream countercurrent to the cool absorbent particles, the internal fluid entering the inlet of bed No. 11 with desorbent enters at a temperature of 92° F.

A stream of n-hexane desorbent is charged at a flow rate of 3 volumes of n-hexane per volume of feed stock aromatics (i.e., at a rate of 31.2 gals./hr.) at 100 lbs./in.$^2$ pressure and at 70° F. into the inlet of the 11th bed downstream from the feed stock inlet. Desorbate, consisting of a mixture of n-hexane desorbent and bicyclic aromatic hydrocarbon absorbate is withdrawn from the outlet of the the 16th bed downstream at a temperature of 72° F., into a fractionating column from which a n-hexane overhead fraction (which is recycled to the desorbent inlet) is recovered from absorbate naphthalenes. The latter product, recovered at a rate of 36.8 gals./hr. consists of naphthalene and methylnaphthalene containing less than 1 percent of raffinate contaminants.

Simultaneous with the foregoing operations, a primary reflux stream consisting of a portion of the desorbate mixture (n-hexane and naphthalenes) bypasses the desorbate outlet and is permitted to reflux into the next adjacent bed downstream beyond the desorbate outlet; i.e., into the 17th bed downstream from the feed stock inlet. The rate of primary reflux flow is controlled to provide a volumetric flow rate of 110 percent of balanced reflux or 277 gals./hr. The primary reflux enters bed 18 from the feed stock inlet and displaces interstitial fluid from between the particles of absorbent, and the displaced fluid from bed 18 in turn displaces interstitial fluid from bed 19, the fluid stream heat exchanging with the solid particles as the relatively hot particles advancing upstream from the absorption zone are contacted with the relatively cool primary reflux. Without additional heat added to the effluent of bed 20, the latter leaves the bottom of bed 20 and enters the absorption zone as pump-around fluid at 185° F., entering the top of the first bed (absorption zone) at a temperature 65° F. below the temperature at which the absorption zone is intended to operate (250° F.). Because the introduction of effluent from the primary rectification zone into the absorption at this temperature would reduce the feed stock inlet temperature too greatly, the displaced fluid stream leaving the outlet of bed 18 is withdrawn from the column at 178° F. and preheated in a gas-fired heat exchanger which raises the temperature of this stream to 260° F., adding an additional $6.42 \times 10^4$ B.t.u./hr. The displaced fluid from bed 18, heated to 260° F. enters the inlet of bed 20 and leaves the bottom of bed 20 at 250° F., joining the feed stock as it enters at 250° F. into the top of bed No. 1.

The inlet and outlet points for the streams flowing into and from the column are shifted in 15 sec. intervals, requiring approximately 5 minutes per cycle.

In the operation above described the raffinate stream (388 gals./hr. of feed stock raffinate) at a temperature of 238° F. is withdrawn from the process flow as secondary product. Since the feed stock is supplied at a temperature of about 70° F., approximately $2.45 \times 10^5$ B.t.u./hr. of supplied process heat is withdrawn from the process as sensible heat in the raffinate effluent.

We claim as our invention:

1. A continuous, cyclic method of changing the temperature of a fluid stream and returning the fluid to substantially its inlet temperature while continuously maintaining substantially the upper and lower temperature extremes as the points of temperature extreme advance at the same spaced intervals through the cycle of temperature changes which comprises continuously circulating in one direction a fluid stream through a fixed mass of solid particles interconnected by fluid flow conducting means at each point along the line of fluid flow, continuously introducing into the circulating fluid an influent stream at one of said temperature extremes, simultaneously changing the temperature of the circulating fluid to the other temperature extreme at a downstream point in the cycle, continuously withdrawing effluent streams from the circulating fluid at the following spaced intervals in the cycle: (1) a point relatively upstream, and (2) a point relatively downstream from the point of high temperature extreme, while simultaneously and continuously refluxing a portion of the circulating fluid at each of the intermediate effluent withdrawal points into the next adjacent mass of solid particles and advancing each of the aforementioned points along the line of flow equidistantly in a downstream direction whereby said solid particles flow in simulated moving bed relationship to said continuously cyclic fluid stream.

2. A continuous-flow, cyclic process for varying the temperature of a fluid stream along its line of flow through a fixed mass of solid particles, which comprises contacting a stream of influent fluid at an inlet temperature in a primary contacting zone, withdrawing a primary effluent product stream from the outlet of the primary contacting zone while simultaneously contacting a secondary reflux portion of the primary effluent product at a point downstream from the output of the primary contacting zone with solid particles having a temperature different than the inlet temperature, and at a more advanced downstream point in the line of fluid flow simultaneously contacting the continuing fluid stream with said solid particles at substantially said inlet temperature whereby heat is transferred between the solid and fluid phases, withdrawing a secondary effluent product from the mass of particles at a still more advanced downstream point in the line of fluid flow, while simultaneously contacting a primary reflux portion of the secondary product with the next adjacent downstream mass of particles, displacing interstitial fluid from the void spaces between the particles farthermost downstream into said primary contacting zone, and equidistantly advancing in a downstream direction the points of initial contact of said influent fluids and the points of last contact of said effluent fluids with said mass of solid particles at a rate of advance which maintains the interstitial fluid substantially in thermal equilibrium with the particles of solid at each point along the line of fluid flow, whereby the point of maximum temperature in the mass of solid particles is advanced in the same direction, at the same rate, and the same distance in a downstream direction as the advance of the points of inlet and the points of withdrawal of said influent and effluent fluid streams, respectively.

3. A continuous, cyclic method of separately contacting an influent fluid stream with a fixed bed of solid particles under counter-current, simulated moving bed flow conditions, whereby heat energy stored in the solid particles is alternately added to and then withdrawn from said fluid and the heat energy carried in the fluid stream is alternately transferred to and then withdrawn from the solid particles by heat exchange of the fluid with separate portions of said fixed bed of particles substantially without net loss of heat exchange capacity from the system, and withdrawing a fluid stream from the process flow at essentially the inlet temperature of said influent stream, said fixed bed comprising in the aggregate at least four serially interconnected zones with fluid flow connecting means between adjacent zones and between the outlet of the last zone and the inlet of the first zone in the series, charging said influent stream at one temperature level into the inlet end of a first solid particle-fluid contacting zone wherein the heat exchange capacity is transferred between phases so that the temperature of one becomes substantially the temperature of the other, simultaneously removing a first effluent fluid from the downstream outlet of the first contacting zone while simultaneously refluxing a portion of said first effluent stream into the inlet end of the next downstream, secondary rectification zone wherein the heat exchange capacity of the solid phase flowing upstream is transferred by heat exchange with the fluid flowing in a downstream direction through a portion of said fixed bed of solid particles comprising a second contacting zone in which the fixed mass of solid particles toward its downstream extremity is at a different temperature than the downstream extremity of said first contacting zone, withdrawing a second effluent from the downstream outlet of the second contacting zone, while simultaneously refluxing a portion of the second effluent stream into the inlet of the next downstream primary rectification zone, simultaneously conducting a continuous stream of fluid effluent of the primary rectification zone into the first contacting zone to thereby complete one continuous cycle, and periodically advancing the points of inlet and outlet of each of said influent and effluent streams to the next serially downstream points of inlet and outlet, while increasing the pressure on the fluid stream between any serially adjacent portions of said bed to a level sufficient to cause the fluid stream in the series of zones to flow continuously in a downstream direction.

4. The process of claim 3 further characterized in that each zone of said series comprises at least two beds per zone with fluid flow connecting means between each of the resulting intermediate beds.

5. The process of claim 3 further characterized in that said zones are in superadjacent and subadjacent relationship to each other.

6. The process of claim 2 further characterized in that the volume of secondary reflux entering the secondary rectification zone is greater than balanced reflux.

7. The process of claim 6 further characterized in that the volume of secondary reflux is from 100 to 150 percent of said balanced reflux.

8. The process of claim 2 further characterized in that the volume of primary reflux entering the primary rectification zone is greater than balanced reflux.

9. The process of claim 8 further characterized in that the rate of primary reflux flow is from 100 to 120 percent of balanced reflux.

10. A method for removing an ionic component from a liquid feed stock in a continuously operated cyclic process in which the ions are withdrawn from the feed stock at a low temperature by a fixed mass of solid ion-retention particles and desorbed at a relatively elevated temperature from the particles in a downstream desorption zone of the cycle, refluxing a portion of the continuously flowing effluent from the ion-retention zone into a secondary rectification zone consisting of a mass of solid particles between the outlet of the ion-retention zone and the inlet of the ion-desorption zone, refluxing a portion of the continuously flowing effluent from the ion-desorption zone into a primary rectification zone between the outlet of the ion-desorption zone and the inlet of the ion-retention zone, thereby providing a continuous, cyclic flow pattern through said zones, continuously withdrawing a liquid effluent of reduced ion concentration from the outlet of the ion-retention zone and withdrawing liquid effluent of greater ion concentration than the feed stock from the outlet of the ion-desorption zone, advancing the influent liquid points of inlet and the effluent liquid points of outlet in the direction of fluid flow and at a rate sufficient to obtain simulated, moving bed flow of the solid phase relative to the liquid phase and the continuous transfer of heat from the solid phase to the liquid phase in the portion of the cycle comprising the secondary rectification zone and the transfer of heat back again from the liquid phase to the solid phase in the portion of the cycle comprising the primary rectification zone, and raising the pressure of the fluid stream at some point in the cycle to cause the fluid to flow continuously in a downstream direction.

11. A method for continuously removing an ionic component from an influent fluid stream which comprises contacting said influent fluid with a fixed mass of solid particles having heat exchange and ion-retention capacity in a continuous, countercurrent flow process in which the fixed mass of solid particles is maintained in simulated moving bed relationship to the fluid stream flowing through said mass of particles, said influent stream being contacted with said particles at a temperature whereby the ionic component of the influent fluid is retained by the solid particles at the lowest temperature in the process, removing from the mass of solid particles at a downstream point in the direction of fluid flow a fluid product of reduced ion content and low temperature, simultaneously and continuously charging a secondary reflux portion of said fluid product into the next adjacent downstream mass of solid particles, continuously charging the effluent interstitial fluid displaced from the mass of solid particles by said secondary reflux into the next adjacent downstream ion-desorption zone maintained at an elevated temperature relative to said ion-retention zone, thereby desorbing ions from the ion-retention particles into the interstitial fluid, adjusting the flow rate of the secondary reflux stream to cool the solid particles advancing upstream through the desorption zone in simulated moving bed relationship to the fluid stream to substantially the temperature of the secondary reflux stream at the outlet of the ion-retention zone, simultaneously increasing the temperature of the fluid stream at a further downstream point in the ion-desorption zone whereby a major proportion of ions from the ion-retention particles is transferred into the hot desorbent fluid, forming a resulting desorbate stream containing a higher concentration of ions than said influent fluid, simultaneously contacting in a further downstream portion of the ion-desorption zone relatively hot desorbate with cool ion-retention particles advancing upstream from the cool, ion-retention zone of the cycle, partially withdrawing desorbate from that portion of said mass of solid particles downstream from that portion of the desorption zone maintained at maximum temperature, refluxing a primary reflux portion of said desorbate into the farthermost downstream mass of solid particles comprising the primary rectification zone, transferring the resulting displaced interstitial fluid leaving the primary rectification zone into the inlet of said ion-retention zone, and advancing all points of inlet and outlet to the corresponding next adjacent downstream masses of solid particles as each farthermost upstream mass of ion-retention particles at the inlet of the influent fluid successively attains equilibrium ion-concentration with said influent fluid.

12. A continuous, cyclic process for removing ions from an aqueous solution by contact with solid ion-retention particles and simultaneously in a separate stage of the process flow regenerating the ion-retention particles which comprises contacting a continuous stream of said aqueous solution with one of a series of stationary beds of solid particles having multiple ion-retaining capacity capable of retaining both cations and anions, said series of beds containing at least four serially interconnected cyclically-arranged zones, each zone containing at least one bed of said ion-retention particles, charging said solution at the lowest temperature maintained in the process cycle into the inlet of one of the beds comprising an ion-retention zone, withdrawing a first effluent stream consisting of substantially deionized water from the outlet of the last bed in the ion-retention zone, while simultaneously refluxing a portion of cool deionized effluent into the first bed of the next downstream zone comprising a secondary rectification zone wherein said first effluent displaces interstitial fluid between the particles of solid in said secondary rectification zone, charging the effluent of said secondary rectification zone into the next downstream ion-desorption zone maintained at a higher temperature than said ion-retention zone, withdrawing a second effluent comprising desorbed ion component from the outlet of said ion-desorption zone while simultaneously refluxing a portion of said second effluent into the next downstream primary rectification zone, withdrawing interstitial fluid from the void spaces between said particles in the primary rectification zone, continuously and simultaneously charging interstitial fluid displaced from the void spaces between the particles of solid in the primary rectification zone into the inlet of said ion-retention zone, thereby completing one cycle of operation, and thereafter, periodically advancing equidistantly the inlets and outlets of the influent and effluent streams to the next adjacent downstream inlets and outlets of said bed respectively, while sufficiently raising the pressure of the fluid stream at any point in the cycle to cause said fluid to flow in a downstream direction.

13. A method of removing a component from a fluid mixture in a continuously operated cyclic process comprising a cool zone in which one of the components of the mixture is retained on a mass of solid particles at a relatively cool temperature and a downstream hot zone in which the retained component is desorbed from the solid particles at a relatively elevated temperature which comprises contacting said mixture at said relatively cool temperature with a fixed mass of said particles whereby the selectively retained component is withdrawn from said mixture by retention on the solid particles, withdrawing from the cycle a portion of the non-retained raffinate component of the mixture, permitting the remainder of the raffinate to enter the next adjacent downstream secondary rectification zone as secondary reflux, while simultaneously displacing interstitial fluid from the void spaces between particles of solid in the secondary rectification zone into the next adjacent downstream mass of particles comprising a desorption zone maintained at said relatively elevted temperature whereby the retained component is transferred from the solid phase into the fluid phase, simultaneously contacting the resulting desorbate from the downstream portion of the desorption zone with a further downstream mass of solid particles having a relatively cool temperature whereby the particles heat exchange with the desorbate fluid thereby cooling the fluid stream and heating the solid particles, simultaneously withdrawing a portion of cooled desorbate stream from the cycle while permitting a primary reflux portion of the desorbate fluid to enter the next adjacent downstream mass of particles comprising a primary rectification zone, transferring effluent interstitial fluid displaced from the primary rectification zone into said cool zone and advancing each of said influent and effluent points of inlet and outlet along the line of flow in a downstream direction at a rate sufficient to maintain substantial equilibrium between the solid phase and the fluid phase with respect to the transfer of said selective component from one phase to another.

14. The process of claim 13 further characterized in that the influent fluid is a mixture of compounds at least one component of which is selectively absorbed on a solid absorbent particle, and a second fluid stream capable of displacing adsorbed component from the solid adsorbent particle at said relatively elevated temperature is simultaneously introduced as desorbent into said desorption zone.

15. The process of claim 14 further characterized in that said influent fluid is a hydrocarbon mixture containing an aromatic component and said solid adsorbent is selected from the group consisting of the activated silicas, activated carbons and activated aluminas.

16. The process of claim 14 further characterized in that said influent fluid is a mixture of straight chain and non-straight chain organic compounds and said solid adsorbent is a molecular sieve capable of retaining within the porous structure of the molecular sieve particle said straight chain component of said mixture.

17. The process of claim 16 further characterized in that said molecular sieve adsorbent is a metal aluminosilicate in which the metal is selected from the alkali and alkaline earth metals.

18. The process of claim 11 further characterized in that said aqueous solution is sea water.

19. The method of separating one component from a fluid mixture of compounds in a continuously operated, cyclic process comprising a relatively hot absorption zone in which one of the components of the mixture is retained on a mass of solid absorbent particles and a cool zone relatively downstream with respect to the hot zone in which the retained component is desorbed from the solid particles at a relatively cool temperature, which comprises contacting in an absorption zone said mixture with a fixed mass of solid particles at an elevated temperature at which the selectively retained component is withdrawn from said mixture by retention on the solid particles, withdrawing from the mass of solid particles a portion of the nonretained component of the mixture while simultaneously permitting the remaining portion of the nonretained component to enter the next adjacent downstream secondary rectification zone as secondary reflux, simultaneously displacing interstitial fluid from the void spaces between particles of solid into the next adjacent mass of particles downstream from the secondary rectification zone comprising a desorption zone maintained at a lower temperature than the initial contacting zone to thereby desorb the component retained on the solid absorbent into the fluid phase, simultaneously contacting the resulting desorbate comprising selectively retained component with a further downstream mass of solid particles of lower temperature than the contacting zone whereby the particles of solid in said downstream mass undergo heat exchange with the desorbate fluid, thereby cooling the solid particles and heating the fluid stream simultaneously withdrawing from the process cycle a portion of heat-exchanged desorbate stream, while permitting a primary reflux portion of the desorbate fluid to enter the next adjacent downstream mass of particles comprising a primary rectification zone, simultaneously conveying displaced interstitial fluid from the void spaces between particles of solid from the farthermost downstream end of the primary rectification zone into said absorption zone and advancing each of the influent and effluent points along the line of flow in a downstream direction at a rate sufficient to maintain substantial equilibrium between the solid phase and fluid phase with respect to the transfer of said selectively retained components from one phase to another.

20. The process of claim 19 further characterized in that said solid is a mass of porous adsorbent particles infused with a selective solvent for the selectively retained component.

21. The process of claim 19 further characterized in that the rate of secondary reflux flow is equal substantially to the sum of the void space volume in the next adjacent downstream mass of solid particles between the entrance to the secondary rectification zone and the next downstream fluid outlet, plus the volume of component retained on the solid particles in said next downstream mass of particles.

22. The process of claim 19 further characterized in that the flow rate of said primary reflux stream is greater than balanced reflux.

References Cited by the Examiner

UNITED STATES PATENTS

| | | | |
|---|---|---|---|
| 2,669,713 | 2/1954 | Osmun | 210—30 |
| 2,799,363 | 7/1957 | Miller | 55—60 |
| 2,799,364 | 7/1957 | Miller | 55—31 |
| 2,985,589 | 5/1961 | Broughton et al. | 210—34 |

MORRIS O. WOLK, *Primary Examiner.*